United States Patent
Sachs et al.

(10) Patent No.: US 9,773,196 B2
(45) Date of Patent: Sep. 26, 2017

(54) UTILIZING DEEP LEARNING FOR AUTOMATIC DIGITAL IMAGE SEGMENTATION AND STYLIZATION

(71) Applicant: Adobe Systems Incorporated, San Jose, CA (US)

(72) Inventors: Ian Sachs, San Francisco, CA (US); Xiaoyong Shen, Hong Kong (CN); Sylvain Paris, Jamaica Plain, MA (US); Aaron Hertzmann, San Francisco, CA (US); Elya Shechtman, Seattle, WA (US); Brian Price, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/005,855

(22) Filed: Jan. 25, 2016

(65) Prior Publication Data

US 2017/0213112 A1   Jul. 27, 2017

(51) Int. Cl.
  G06K 9/62   (2006.01)
  G06K 9/66   (2006.01)
  G06T 7/00   (2017.01)
  G06K 9/46   (2006.01)

(52) U.S. Cl.
  CPC ............. G06K 9/66 (2013.01); G06K 9/4604 (2013.01); G06T 7/0081 (2013.01)

(58) Field of Classification Search
  CPC .................................. G06K 9/66; G06K 9/4604
  See application file for complete search history.

(56) References Cited

U.S. PATENT DOCUMENTS

| 2016/0104053 A1* | 4/2016 | Yin | G06K 9/00228 382/156 |
| 2016/0379041 A1* | 12/2016 | Rhee | G06K 9/00275 382/118 |
| 2017/0046563 A1* | 2/2017 | Kim | G06K 9/00275 |
| 2017/0076474 A1* | 3/2017 | Fu | G06T 11/60 |

OTHER PUBLICATIONS

Arbelaez P., Hariharan B., Gu C., Gupta S., Bourdev L. D., Malik J.: Semantic segmentation using regions and parts. In CVPR (2012), pp. 3378-3385.

(Continued)

*Primary Examiner* — Phuoc Tran
(74) *Attorney, Agent, or Firm* — Keller Jolley Preece

(57) ABSTRACT

Systems and methods are disclosed for segregating target individuals represented in a probe digital image from background pixels in the probe digital image. In particular, in one or more embodiments, the disclosed systems and methods train a neural network based on two or more of training position channels, training shape input channels, training color channels, or training object data. Moreover, in one or more embodiments, the disclosed systems and methods utilize the trained neural network to select a target individual in a probe digital image. Specifically, in one or more embodiments, the disclosed systems and methods generate position channels, training shape input channels, and color channels corresponding the probe digital image, and utilize the generated channels in conjunction with the trained neural network to select the target individual.

20 Claims, 14 Drawing Sheets

(56) References Cited

OTHER PUBLICATIONS

Boykov Y. Y., Jolly M.-P.: Interactive graph cuts for optimal boundary & region segmentation of objects in N-D images. In ICCV (2001), vol. 1, pp. 105-112.
Bai X., Sapiro G.: A geodesic framework for fast interactive image and video segmentation and matting. In ICCV (2007), pp. 1-8.
Chuang Y., Curless B., Salesin D., Szeliski R.: A bayesian approach to digital matting. In CVPR (2001), pp. 264-271.
Chen H., Liu Z., Rose C., Xu Y., Shum H.-Y., Salesin D.: Example-based composite sketching of human portraits. In Proceedings of the 3rd International Symposium on Non-photorealistic Animation and Rendering (New York, NY, USA, 2004), NPAR '04, ACM, pp. 95-153.
Chen Q., Li D., Tang C.: KNN matting. IEEE Trans. Pattern Anal. Mach. Intell. 35, 9 (2013), 2175-2188.
Chen L., Papandreou G., Kokkinos I., Murphy K., Yuille A. L.: Semantic image segmentation with deep convolutional nets and fully connected crfs. ICLR (2014).
Dai J., He K., Sun J.: Boxsup: Exploiting bounding boxes to supervise convolutional networks for semantic segmentation. CVPR (2015).
Everingham M., Gool L. J. V., Williams C. K. I., Winn J. M., Zisserman A.: The pascal visual object classes (VOC) challenge. International Journal on Computer Vision 88, 2 (2010), 303-338.
Farabet C., Couprie C., Najman L., Lecun Y.: Learning hierarchical features for scene labeling. IEEE Trans. Pattern Anal. Mach. Intell. 35, 8 (2013), 1915-1929.
Grady L.: Random walks for image segmentation. IEEE Trans. Pattern Anal. Mach. Intell. 28, 11(2006), 1768-1783.
Hall M.: Family albums fade as the young put only themselves in picture. Jun. 17, 2013. Telegraph Media Group.
Hacohen Y., Shechtman E., Goldman D. B., Lischinski D.: Non-rigid dense correspondence with applications for image enhancement. ACM Trans. Graph. 30, 4 (2011), 70.
Jia Y., Shelhamer E., Donahue J., Karayev S., Long J., Girshick R., Guadarrama S., Darrell T.: Caffe: Convolutional architecture for fast feature embedding. arXiv preprint arXiv:1408.5093 (2014).
Krähenbühl P., Koltun V.: Efficient inference in fully connected crfs with gaussian edge potentials. In NIPS (2011), pp. 109-117.
Kass M., Witkin A. P., Terzopoulos D.: Snakes: Active contour models. International Journal on Computer Vision 1, 4 (1988), 321-331.
Leyvand T., Cohen-Or D., Dror G., Lischinski D.: Data-driven enhancement of facial attractiveness. ACM Transactions on Graphics (Proceedings of ACM SIGGRAPH 2008) 27, (Aug. 3, 2008).
Levin A., Lischinski D., Weiss Y.: A closed-form solution to natural image matting. IEEE Trans. Pattern Anal. Mach. Intel. 30, 2 (2008), 228-242.
Lin T., Maire M., Belongie S., Hays J., Perona P., Ramanan D., Dollár P., Zitnick C. L.: Microsoft COCO: common objects in context. In ECCV (2014), pp. 740-755.
Long J., Shelhamer E., Darrell T.: Fully convolutional networks for semantic segmentation. CVPR (2014).
Liu J., Sun J., Shum H.: Paint selection. ACM Trans. Graph. 28, 3 (2009).
Li Y., Sun J., Tang C., Shum H.: Lazy snapping. ACM Trans. Graph. 23, 3 (2004), 303-308.
Mortensen E. N., Barrett W. A.: Intelligent scissors for image composition. In Proceedings of ACM SIGGRAPH (1995), pp. 191-198.
Mick J.: HTC: 90% of phone photos are selfies, we want to own the selfie market. http://www.dailytech.com/HTC+90+of+Phone+Photos+are+Selfies+We+Want+to+Own+the+Selfie+Market/article34756.htm. Apr. 21, 2014.
Mostajabi M., Yadollahpour P., Shakhnarovich G.: Feedforward semantic segmentation with zoom-out features. CVPR (2014).
Rother C., Kolmogorov V., Blake A.: "grabcut": interactive foreground extraction using iterated graph cuts. ACM Trans. Graph. 23, 3 (2004), 309-314.
Rhemann C., Rother C., Wang J., Gelautz M., Kohli P., Roti P.: A perceptually motivated online benchmark for image matting. In CVPR (2009), pp. 1826-1833.
Sun J., Jia J., Tang C., Shum H.: Poisson matting. ACM Trans. Graph. 23, 3 (2004), 315-321.
Saragih J. M., Lucey S., Cohn J. F.: Face alignment through subspace constrained mean-shifts. In ICCV (2009), pp. 1034-1041.
Shih Y., Paris S., Barnes C., Freeman W. T., Durand F.: Style transfer for headshot portraits. ACM Trans. Graph. 33, 4 (2014), 148:1-148:14.
Wang J., Cohen M. F.: Image and video matting: A survey. Foundations and Trends in Computer Graphics and Vision 3, 2 (2007), 97-175.
Winnemöller H.: Xdog: advanced image stylization with extended difference-of-gaussians. pp. 147-156. Aug. 2011.
Wu J., Shen X., Liu L.: Interactive two-scale color-to-gray. The Visual Computer 28, 6-8 (2012), 723-731.
Zheng S., Jayasumana S., Romera-Paredes B., Vineet V., Su Z., Du D., Huang C., Torr P. H. S.: Conditional random fields as recurrent neural networks. ICCV (2015).

\* cited by examiner

UTILIZING DEEP LEARNING FOR AUTOMATIC DIGITAL IMAGE SEGMENTATION AND STYLIZATION

BACKGROUND

1. Technical Field

The present disclosure relates generally to selecting objects in digital visual media. More specifically, one or more embodiments of the present disclosure relate to systems and methods that utilize deep learning techniques to automatically select individuals in digital images.

2. Background and Relevant Art

Recent years have seen a rapid proliferation in the use of mobile digital devices. Individuals and businesses increasingly utilize laptops, tablets, smartphones, handheld devices, and other mobile technology for a variety of daily tasks, and the ubiquitous use of such mobile digital devices has had a significant impact in a variety of fields. For example, with regard to digital photography, individuals and businesses increasingly utilize smartphone cameras to capture digital visual media.

With the rapid adoption of smartphone cameras, the "selfie" has become conspicuously abundant in digital photography. The bulk of these images are captured by casual photographers who often lack the necessary skills to consistently take high-quality images, or to successfully post-process captured digital images. Accordingly, individuals routinely desire to select, segregate, and/or modify a digital representation of an individual in an image separately from other background pixels (e.g., to replace the background or otherwise modify the individual portrayed in the digital image). Accordingly, there is an increasing demand for systems that can identify, segregate, and treat a person captured in a digital image separately from the background.

Some conventional digital image editing systems assist users in segregating an individual portrayed in a digital image from background images. For example, some conventional digital image editing systems permit a user to manually select an individual in a digital image by, for example, manually tracing a boundary line around the individual. Similarly, other convention digital image editing systems can select an individual portrayed in a digital image based on repeated user selections of points or areas that lie inside or outside the represented individual. Unfortunately, these conventional tools have a number of shortcomings.

For example, users often find conventional digital image editing systems tedious and difficult to use. Indeed, the time and effort required to input boundary lines, points, and/or areas often leads to frustration among users of conventional systems. Moreover, users are often disappointed with the results of conventional systems because they fail to accurately segregate individuals portrayed in digital images from background pixels.

These and other problems exist with regard to identifying objects in digital visual media.

BRIEF SUMMARY

Introduced here are techniques/technology that identify objects utilizing deep learning techniques. In particular, in one or more embodiments, systems and methods utilize deep learning techniques to select individuals portrayed within digital images. For example, in one or more embodiments, the disclosed systems and methods utilize a trained neural network to automatically select an individual portrayed within a digital image. Specifically, the disclosed systems and methods provide a trained neural network with position and/or shape information (e.g., position channels and shape input channels) corresponding to an individual portrayed in a digital image and utilize the neural network to select the individual portrayed in the digital image.

For example, in one or more embodiments, the disclosed systems and methods train a neural network utilizing training input generated from a repository of digital training images. A probe digital image portrays a target individual. The disclosed systems and methods generate a position channel and a shape input channel with regard to the probe digital image. The position channel indicates positions of pixels in the probe digital image relative to the target individual portrayed in the probe digital image. The shape input channel comprises an estimated shape of the target individual. In addition, the disclosed systems and methods utilize the trained neural network, the generated position channel, and the generated shape input channel, to identify a set of pixels representing the target individual in the probe digital image.

By utilizing a trained neural network, position channel, and shape input channel, the disclosed systems and methods are able to select individuals portrayed in digital images with increased accuracy. Indeed, in one or more embodiments, the disclosed systems and methods are able to identify pixels corresponding to an individual portrayed in a digital image with greater than 95% IoU accuracy.

Moreover, the disclosed systems and methods enable users to select individuals portrayed in digital images with less time and user interaction. Indeed, in one or more embodiments, the disclosed systems and methods enable users to automatically select an individual portrayed in a digital image (i.e., select the portrayed individual without user input beyond a select request). Accordingly, the disclosed systems and methods provide more accurate results with less time and user interaction.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
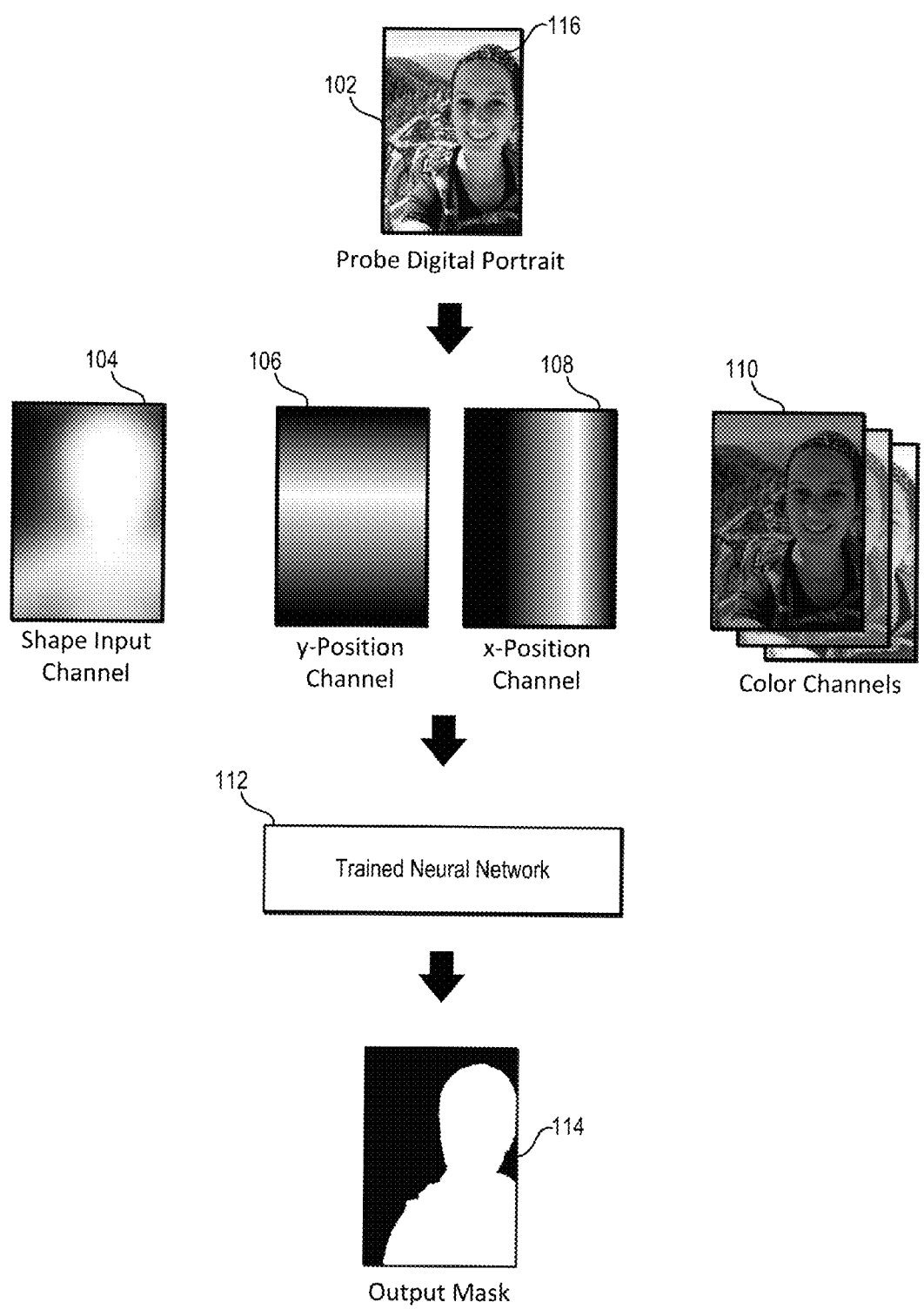
FIG. 1 illustrates a sequence diagram of selecting a target individual in a digital image in accordance with one or more embodiments.

One or more embodiments of the present disclosure include a digital segmentation system that identifies individuals portrayed in digital visual media. More particularly, the digital segmentation system can identify individuals in probe digital images utilizing interactive deep learning techniques. For example, in one or more embodiments, the digital segmentation system trains a neural network utilizing digital training images and image-specific position and shape information. Moreover, the digital segmentation system utilizes the trained neural network to segregate an individual portrayed in a probe digital image from background pixels portrayed in the probe digital image.

By utilizing a trained neural network together with image-specific special information (e.g., position channels and/or shape input channels), the digital segmentation system can select a target individual portrayed in a probe digital image quickly and accurately. Indeed, in one or more embodiments, upon detecting a user interaction indicating a request to select a target individual portrayed in a probe digital image, the digital segmentation system automatically (i.e., without additional user input) identifies a set of pixels representing the target individual portrayed in the probe digital image. Accordingly, the digital segmentation system can reduce the amount of time and user interaction required to select a target individual portrayed in a probe digital image while increasing the accuracy of the resulting selection.

In one or more embodiments, the digital segmentation system utilizes spatial information to select a target individual in a probe digital image. In particular, in one or more embodiments, the digital segmentation system generates and utilizes position channels and/or shape input channels to select a target individual. More specifically, in one or embodiments, the digital segmentation system provides one or more of position channels, shape input channels, and color channels to a trained neural network. Utilizing the one or more of position channels, shape input channels, of color channels the trained neural network can identify a set of pixels representing the target individual.

As used herein, the term "position channel" refers to a digital item that reflects a distance between one or more pixels in a digital image and an individual portrayed in the digital image. For example, a position channel can include a matrix, index, data file, or other digital item with values corresponding to pixels in a digital image, where the values reflect the position of each pixel. For instance, the values of the position channel can reflect the position of each pixel in the digital image relative to an individual (e.g., a face or facial feature point of an individual) portrayed in the digital image.

More specifically, in one or more embodiments, the position channel reflects a position of one more pixels in a digital image relative to an individual portrayed in a digital image upon normalizing the digital image. In particular, in one or more embodiments, the digital segmentation system normalizes a position channel by applying a transform. As used herein, the term "transform" refers to a mapping from points in one view to points in another view. In particular, the term "transform" includes a homography transform. For example, a transform can comprise a matrix, equation, or other mathematical construct relating a data point on a plane represented in a first digital image to a point in a plane represented in a second digital image. Specifically, a transform can comprise an equation that maps a canonical pose, an individual, a face, facial feature points, pixels or other representations in a digital image to another plane (e.g., another individual in another digital image, another face in another digital, facial feature points in another digital image, another canonical pose, or other pixels or points). A transform can modify position, scale, rotation, or any other characteristic to align points in a first plane (e.g., in a first digital image or canonical pose) to points in a second plane (e.g., in a second digital image or canonical pose).

With regard to the position channel, in one or more embodiments, the digital segmentation system calculates a transform between a canonical pose and an individual (e.g., a face of an individual) portrayed in a digital image (or vice versa). For example, the digital segmentation system can estimate a transform between a canonical pose and corresponding facial feature points of an individual in a digital image, and then apply the transform to the canonical pose to generate a position channel.

As used herein, the term "canonical pose" refers to a digital item reflecting template features of an individual. In particular, a canonical pose can include a standard coordinate system relative to template features of an individual. For example, a canonical pose can include a template face, with a standard center, scale, size, and rotation (e.g., template eyes, nose, forehead, hair, chin, cheeks, eyebrows, or center). A canonical pose can be based on a template digital image (e.g., the center, scale, size, and rotation of a template face can comprise a face portrayed in a template digital image). Similarly, a canonical pose can consist of an image comprising standard x and y positions (i.e., canonical x and y channels) reflecting template features of an individual.

Upon generating a transform between a canonical pose and an individual portrayed in a digital image, the digital segmentation system can apply the transform to generate a position channel. Specifically, the digital segmentation system can generate a position channel by applying the transform to the canonical pose (e.g., an image of canonical x and y positions) such that after application of the transform, the position channel reflects a position of pixels in the probe digital image in a coordinate system centered on the face of the individual in the digital image and scaled according to the size of the face relative to the canonical pose (i.e., a normalized position channel). More specifically, in one or more embodiments, the position channel expresses the position of pixels in a canonical pose upon application of a transform that modifies the canonical pose according to an individual portrayed in a probe digital image. Thus, although one or more embodiments express the pixels of the canonical pose after application of the transform, the position channel indicates the position of pixels in the probe digital image relative to the face of the individual in the digital image.

Furthermore, as described in greater detail below, the digital segmentation system can also generate more than one position channel with regard to a digital image. For example, in one or more embodiments, the digital segmentation system generates an x-position channel (i.e., a position channel measuring horizontal position of pixels relative to a face portrayed in a digital image) and a y-position channel (i.e., a position channel measuring vertical position of pixels relative to a face portrayed in a digital image).

As mentioned above, the digital segmentation system can also generate one or more shape input channels for use in selecting a target individual in a digital image. As used herein, the term "shape input channel" refers to a digital item that estimates the shape of a target individual portrayed in a digital image. In particular, the "shape input channel" includes a matrix, index, digital file, or other digital item that estimates the shape (e.g., position, contour, size, rotation, and/or orientation) of a target individual portrayed in a digital image based on a plurality of other individuals portrayed in other digital images.

In particular, in one or more embodiments, the digital segmentation system generates a shape input channel based on a mean digital object mask. As used herein, the term "mean digital object mask" refers to a digital item reflecting a plurality of target individuals portrayed in a plurality of digital images. More specifically, the term "mean digital object mask" includes a matrix, array, index, digital file, boundary, collection of pixels, or other digital item that comprises a shape aligned to a canonical pose. The shape is based on shapes of a plurality of target individuals portrayed in a plurality of digital images. For example, a mean digital object mask can include an average mask based on masks of a plurality of individuals portrayed in a plurality of digital images. In such cases, the average mask is oriented and scaled to a canonical pose.

As described in greater detail below, in one or more embodiments, the digital segmentation system utilizes the mean digital object mask to generate a shape input channel. In particular, the digital segmentation system calculates a transform between a canonical pose and an individual portrayed in a digital image. The digital segmentation system then utilizes the calculated transform with regard to the mean digital object mask to generate a shape input channel. Specifically, the digital segmentation system applies the transform to the mean digital object mask to generate a shape input channel oriented and scaled to estimate the shape and orientation of the target individual portrayed in the digital image.

As mentioned, the digital segmentation system can utilize a trained neural network to identify a target individual in a probe digital image. As used herein, the term "neural network" refers to a machine learning model that can be tuned (e.g., trained) based on training input to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms. In particular, the term "neural network" includes deep convolutional neural networks (i.e., "CNNs") and fully convolutional neural networks (i.e., "FCNs"). In other words, a neural network is an algorithm that implements deep learning techniques, i.e., machine learning that utilizes a set of algorithms to attempt to model high-level abstractions in data.

To train the neural network, the digital segmentation system can generate position channels and/or shape input channels and utilize the generated channels with a trained neural network to select a target individual. In addition to utilizing the trained neural network, however, the digital segmentation system can also train the neural network. In particular, in one or more embodiments, the digital segmentation system trains a neural network utilizing a repository of digital training images. In particular, the digital segmentation system can train a neural network by accessing or generating training input with regard to target individuals portrayed in digital training images. Specifically, the digital segmentation system can access and/or generate training input from a repository of training digital images, where each training digital image portrays a target individual with a known ground-truth mask.

As used herein, the term "training input" refers to information provided to train a neural network. In particular, the term training input refers to information provided to train a neural network to identify target individuals portrayed in digital images. As discussed in greater detail below, training input can include a variety of information, including one or more position channels, one or more shape input channels, one or more color channels, and/or training object data (e.g., one or more ground-truth masks).

For example, in one or more embodiments the digital segmentation system provides training input to a neural network, wherein the training input comprises training position channels, a shape input channel, color channels, and a ground-truth mask corresponding to each digital training image. The neural network can utilize the training input to learn to accurately identify target individuals portrayed in digital images.

In addition to selecting a target individual in a probe digital image, the digital segmentation system can also apply modifications to a probe digital image based on a selected target individual. For example, the digital segmentation system can apply one or more styles or filters to a selected individual (and/or identified background pixels). Similarly, the digital segmentation system can move, resize, rotate, copy, paste, or otherwise modify a selected individual in a probe digital image. In this manner, the digital segmentation system enables users to quickly, easily, accurately, and independently select and stylize target individuals portrayed in probe digital images.

As discussed above, the digital segmentation system can utilize a trained neural network to select a target individual within a probe digital image and the digital segmentation system can train a neural network based on a repository of digital images. Additional detail will now be provided through illustrative figures regarding the process of using and generating a trained neural network to select a target individual. First, with regard to FIG. 1 embodiments will be described for utilizing a trained neural network to select a target individual in a probe digital image. Second, with regard to FIGS. 2-3, description is provided regarding training a neural network (e.g., a fully convolutional neural network) utilized by the digital segmentation system in one or more embodiments. Thereafter, with regard to FIGS. 4A-6, additional detail will be provided regarding generating position channels, shape input channels, and mean digital object masks in accordance with one or more embodiments.

Accordingly, turning now to FIG. 1, additional detail will be provided regarding utilizing a trained neural network to select a target individual in a probe digital image utilizing position channels and/or shape input channels. As used herein, the term "target object" (or "target individual) refers to an object (or individual) reflected in digital visual media that is sought to be identified. For instance, the term "target individual" includes an individual reflected in a digital training image, where a neural network is trained by attempting to identify the individual. Moreover, the term "target individual" includes an individual reflected in a probe digital image that a user seeks to select.

As used herein, the term "select" when used in conjunction with a target object (e.g., target individual) refers to identifying pixels that represent the target object (e.g., individual). The term "select" includes identifying a set of all pixels that make up a target individual in digital visual media. Moreover, the term "select" includes generating an object boundary that encompasses pixels that represent a target object (i.e., an object boundary that comprises a line, polygon, or other element that encompass a target object). Similarly, the term "select" includes generating an output mask that identifies the pixels representing a target object. In particular, in one or more embodiments, "select" means precisely delineating individuals' upper body (from the shoulders up) within digital images. In such embodiments, "selecting" is in contrast to a rough bounding box or detecting an entire body.

In particular, FIG. 1 illustrates a probe digital image 102 utilized to generate an output mask 114. More specifically, as illustrated, the digital segmentation system generates a shape input channel 104, a y-position channel 106, an x-position channel 108, and color channels 110. The digital segmentation system provides the shape input channel 104, the y-position channel 106, the x-position channel 108, and the color channels 110 to a trained neural network 112, and the trained neural network 112 generates the output mask 114.

As illustrated, the probe digital image 102 is a digital image comprising a target individual 116 and background pixels (i.e., pixels that do not make up the target individual). Depending on the embodiment, the probe digital image 102 can comprise any type of digital visual media. For example, although illustrated in FIG. 1, as an image, the digital segmentation system can also perform its functions with regard to other digital images. As used herein, the term "digital visual media" refers to any digital item capable of producing a visual representation. For instance, the term "digital visual media" includes digital images and digital video. As used herein, the term "digital image" refers to any digital symbol, picture, icon, or illustration. For example, the term "digital image" includes digital files with the following file extensions: JPG, TIFF, BMP, PNG, RAW, or PDF. Similarly, as used herein, the term "digital image" refers to a digital image comprising an individual. In particular, the term "digital image" includes a digital image portraying the face and shoulders of a single individual (e.g., without portraying feet, legs, and/or waist of the single individual). Moreover, as used herein the term, "probe digital image" (or "probe digital image) refers to a digital image (or image) comprising a target individual that the digital segmentation system seeks to select (e.g., that a user seeks to select).

As mentioned previously, in one or more embodiments, the digital segmentation system utilizes a shape input channel to select a target individual. Accordingly, with regard to the embodiment of FIG. 1, the digital segmentation system generates the shape input channel 104 from the probe digital image 102. As shown, the shape input channel 104 comprises an estimated shape of the target individual 116. In particular, as described in greater detail below, the shape input channel 104 comprises a shape (e.g., an average mask) estimated from the shapes (e.g., masks) of a plurality of target individuals in a plurality of digital images. Specifically, as described with regard to FIGS. 5A-5B below, the shape input channel 104 is a mean digital object mask generated from the ground truth masks of a plurality of digital images and aligned and scaled to detected features of the target individual 116.

As used herein, the term "mask" refers to a set of pixels reflecting an object (e.g., an individual) portrayed in digital visual media. In particular, the term "ground truth mask" refers to a known set of pixels reflecting an object (e.g., an individual) portrayed in a digital image. Accordingly, the term "ground truth mask" includes a set of all pixels reflecting an individual portrayed in a digital image. Similarly, the term "output mask" refers to a set of pixels reflecting an object portrayed in digital visual media produced by the digital segmentation system. For example, the term "output mask" includes a set of pixels reflecting an individual portrayed in a digital image produced by a trained neural network.

In one or more embodiments, the digital segmentation system utilizes a feature detection algorithm to identify the target individual 116, a face of the target individual 116, and/or one or more facial feature points of the target individual 116. For example, one or more embodiments utilize a robust facial feature detection algorithm. The robust facial feature detection algorithm can detect facial features (e.g., facial feature points) with regard to a target individual in a digital image (e.g., digital image).

The digital segmentation system can utilize detected features of a target individual to align and scale a mean digital object mask to the target individual. In this manner, the digital segmentation system can generate an estimated shape of the target individual. Thus, as shown in FIG. 1, the digital segmentation system generates the shape input channel 104 by aligning a mean digital object mask based on detected facial feature points of the target individual 116.

The digital segmentation system can express a shape input channel in a variety of formats, units, or file types. For example, FIG. 1 illustrates the shape input channel 104 as a gray scale image where the scale of each pixel reflects a likelihood that the pixel corresponds to the target individual 116 based on a plurality of target individuals portrayed in other digital images. Specifically, and as described in greater detail below number, the color, shade, or scale of each pixel reflects a number or percentage of other target individuals with a shape (e.g., mask) that corresponds to the particular pixel.

In other embodiments, the digital segmentation system expresses the shape input channel as one or more numerical values. For example, in one or more embodiments, the digital segmentation system expresses the shape input channel as an array, matrix, database, or spreadsheet of numerical values rather than as a grayscale image. Specifically, the digital segmentation system can express the shape input channel as a two-dimensional matrix with values corresponding to each pixel in a digital image (e.g., digital image). The digital segmentation system can express the shape input channel with regard to any unit and or format. Additional detail regarding generating the shape input channel will be provided below with regard to FIGS. 5A-5B.

In addition to the shape input channel 104, as shown in FIG. 1, the digital segmentation system also generates the y-position channel 106 and the x-position channel 108. The y-position channel 106 and the x-position channel 108 reflect positions of the pixels making up the probe digital image 102 relative to the target individual 116 portrayed in the probe digital image 102. Specifically, the y-position channel 106 reflects the vertical position of each pixel in the probe digital image 102 relative to the face (e.g., a center point of the face) of the target individual 116 and the x-position channel 108 reflects the horizontal position of each pixel in the probe digital image 102 relative to the face (e.g., the center point of the face) of the target individual 116.

As just mentioned, the digital segmentation system can utilize one or more facial detection algorithms to locate an individual, face, or facial feature points. Thus, with regard to the embodiment of FIG. 1, the digital segmentation system identifies the location of the target individual 116 (e.g., the center point of the face of the target individual 116) and utilizes the location to generate the y-position channel 106 and the x-position channel 108.

The digital segmentation system can detect any portion or feature of an individual and generate a position channel relative to the detected portion or feature. For example, the digital segmentation system utilizes a feature detection algorithm to locate an individual, a face of an individual, and/or one or more facial feature points (e.g., facial feature points corresponding to an individual's eyes, eyebrows, nose, chin, forehead, cheeks and/or other features). The digital segmentation system then generates the position channel based on the position of the pixels in the digital image relative to the detected individual, face, and/or facial feature points.

As described in greater detail below, in one or more embodiments, the digital segmentation system generates the y-position channel 106 and the x-position channel 108, such that the position of each pixel is normalized (e.g., centered and scaled according to the location and size of the target individual 116). In particular, the digital segmentation system can generate the y-position channel 106 (and/or the x-position channel 108) such that each value in the y-position channel 106 is expressed in terms of a coordinate system centered on the face (e.g., the center of the face) of the target individual 116, where the coordinate system is scaled according to the size of the face of the target individual 116 relative to a canonical pose.

Although FIG. 1 illustrates the y-position channel 106 and the x-position channel 108, it will be appreciated that in other embodiments, the digital segmentation system can produce a different number of position channels. For example, in one or more embodiments, the digital segmentation system generates a single position channel that reflects the position of pixels relative to a target individual (e.g., reflects both vertical and horizontal position or a distance, such as a Euclidean distance). In other embodiments, the digital segmentation system generates more than two position channels. For example, the digital segmentation system can generate an x-position channel, a y-position channel, and a geodesic position channel (e.g., a channel that reflects geodesic distance that utilizes curved paths to traverse along a particular color or range of colors within a given image).

The digital segmentation system can generate position channels that express position (or distance) in a variety of formats, units, or file types. For example, FIG. 1 illustrates the y-position channel 106 and the x-position channel 108 as grayscale images, where the shade of each pixel corresponds to a position relative to the target individual 116. In other embodiments, the position channels are stored as numerical values (e.g., numerical distances or positions) in a matrix, array, database, or spreadsheet, rather than as grayscale pixels. For instance, the digital segmentation system can generate a position channel as a two-dimensional matrix with values (i.e., position or distance values) that correspond to each pixel in a probe digital image. Regardless of form, the digital segmentation system can express position channels with regard to any unit, format, or measure of distance. Additional detail regarding generating position channels will be provided below with regard to FIGS. 4A-4B.

Moreover, as shown in FIG. 1, the digital segmentation system can also generate color channels 110. The color channels 110 reflect the color of each pixel in the probe digital image 102. In particular, with regard to the embodiment of FIG. 1, the digital segmentation system generates three color channels, an R color channel, a G color channel, and a B color channel. The R color channel reflects the amount of red with regard to pixels in the probe digital image 102, the G color channel reflects the amount of green with regard to pixels in the probe digital image 102, and the B color channel reflects the amount of blue with regard to pixels in the probe digital image 102.

Although illustrated as three separate channels, the digital segmentation system can utilize fewer or more channels. For example, the digital segmentation system utilizes four color channels in conjunction with CMYK digital images. Similarly, the digital segmentation system can utilize a single color channel with regard to gray scale digital images.

Moreover, although illustrated as R, G, and B channels with regard to FIG. 1, it will be appreciated that the digital segmentation system can utilize a variety of other colors or color spaces for color channels. For instance, in one or more embodiments, the digital segmentation system utilizes an LAB color space and LAB color channels rather than an RGB color space and RGB color channels. Moreover, as just mentioned, the digital segmentation system can utilize CMYK digital images, gray scale digital images, or other digital images.

Although FIG. 1 illustrates the color channels 110 represented as digital images, the digital segmentation system can generate color channels of any format, units, or file types. For example, each of the color channels 110 can comprise a matrix, array, database, or spreadsheet rather than digital images comprising a plurality of pixels. For instance, the digital segmentation system can generate a color channel as a two-dimensional matrix with values (i.e., color values) that correspond to each pixel in a probe digital image. Regardless of form, the digital segmentation system can express color channels with regard to any unit, format, or measure of color.

As shown in FIG. 1, the digital segmentation system provides the shape input channel 104, the y-position channel 106, the x-position channel 108, and the color channels 110 to the trained neural network 112. Based on the provided channels, the trained neural network 112 generates the output mask 114. In particular, the trained neural network 112 is a neural network that has been trained utilizing training shape input channels, training position channels, and training digital images (e.g., training digital images) to identify target individuals within probe digital images (e.g., probe digital images). Accordingly, the trained neural network 112 can utilize the shape input channel 104, the y-position channel 106, the x-position channel 108, and the color channels 110 to select the target individual 116 in the probe digital image 102. Specifically, the trained neural network 112 selects the target individual 116 by generating the output mask 114. Additional detail regarding training neural networks, such as the trained neural network 112, will be provided with regard to FIGS. 2-3.

As illustrated, the output mask 114 segregates pixels corresponding to the target individual 116 in the probe digital image 102 from other pixels, such as background pixels. In particular, the white pixels in the output mask 114 correspond to pixels representing the target individual 116 in the probe digital image 102 and the black pixels in the output mask 114 correspond to background pixels in the probe digital image 102 (i.e., pixels that are not part of the target individual 116).

Although the embodiment of FIG. 1 illustrates the trained neural network 112 generating the output mask 114, it will be appreciated that the trained neural network 112 and the digital segmentation system can select a target individual utilizing a variety of methods or outputs. For example, rather than produce the output mask 114, in one or more embodiments, the trained neural network 112 generates an object boundary (e.g., a polygon that surrounds our outlines the target individual 116). In other embodiments, the trained neural network produces a matrix that identifies a set of pixels representing a target individual.

In one or more embodiments, the trained neural network 112 produces a selection score map. In particular, the trained neural network 112 produces a selection score map that reflects probabilities that pixels in the probe digital image 102 correspond to the target individual 116. For example, the trained neural network 112 can produce a selection score map in the form of a matrix or array, with values corresponding to each pixel in the digital image 102, where the values reflect the likelihood that each corresponding pixel represents the target individual 116.

The trained neural network 112 can select the target individual 116 based on the probabilities reflected in a selection score map. For example, the trained neural network 112 can establish a threshold score (e.g., a 50% probability) and select the target individual 116 by applying the threshold score. For instance, in one or more embodiments, the digital segmentation system compares the values of the selection score map with the threshold score and determines pixels that represent a target individual based on the comparison. Thus, in one or more embodiments, the digital segmentation system determines that pixels satisfying the threshold score are part of the target individual and pixels that do not satisfy the threshold probability are not part of the target individual. In this manner, the digital segmentation system can utilize a selection score map to select a target individual, for example, by generating an object boundary (e.g., a segmentation boundary dividing the target individual from background pixels) based on the pixels that satisfy the threshold score.

Moreover, in one or more embodiments, the trained neural network 112 utilizes post-processing techniques to transform the selection score map into the output mask 114 (or some other type of output). For example, in one or more embodiments, the digital segmentation system generates a trimap from the selection score map. Specifically, as used herein, a trimap is a digital item that defines pixels in a digital image based on a plurality of categories (e.g., three categories). For example, in one or more embodiments the digital segmentation system generates a trimap by dividing pixels in a digital image into background, unknown, and target individual (i.e., foreground) categories. Specifically, in one or more embodiments, the digital segmentation system generates a trimap by identifying a segmentation boundary dividing pixels that are part of the target individual from background pixels (e.g., utilizing the selection score map). Moreover, the digital segmentation system can set the pixels within a particular radius from the segmentation boundary (e.g., a 10-pixel radius) into the unknown category, while setting the remaining pixels into the background or target individual categories based on the segmentation boundary.

One or more embodiments of the digital segmentation system also utilize a matting algorithm to perform a final segmentation of pixels. In particular, the digital segmentation system can utilize a matting algorithm in conjunction with a trimap to generate an output mask. For example, in one or more embodiments, the digital segmentation system utilizes KNN matting, as described in Q. Chen, D. Li, & C. Tang, *KNN matting*, IEEE Trans. Pattern Anal. Mach. Intell. 35, 9 (2013) at 2175-2188, which is incorporated by reference here. Additionally, the digital segmentation system can utilize Bayesian matting, Poisson matting, Closed-form matting, or other matting algorithms. Thus, the digital segmentation system can utilize a trained neural network, in conjunction with other tools, to select a target individual in a probe digital image.

Figure 2:
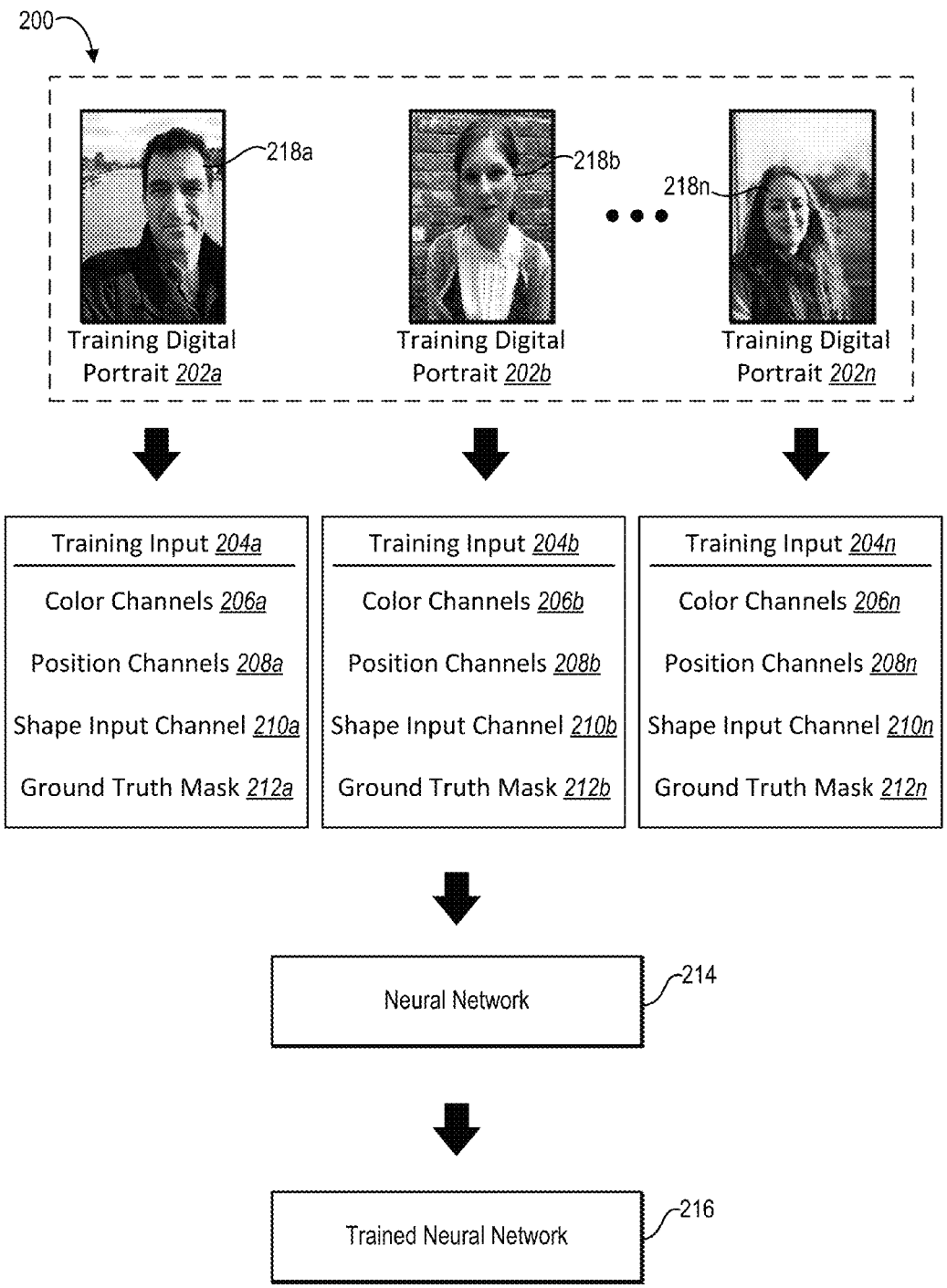
FIG. 2 illustrates a sequence diagram of training a neural network in accordance with one or more embodiments.

As mentioned previously, in addition to utilizing a trained neural network, the digital segmentation system can also generate a trained neural network. FIG. 2 illustrates a method of training a neural network in accordance with one or more embodiments. In particular, FIG. 2 illustrates a plurality of training digital images 202a-202n that are part of a repository 200 of digital images. As illustrated, the training digital images 202a-202n portray target individuals 218a-218n.

As used herein, the term "training" is used to identify an object utilized to train a neural network. Accordingly, training digital images, training position channels, training shape input channels, training color channels, training masks, etc. refer to images, position channels, shape input channels, color channels, or masks utilized to train a neural network. As used herein, the term "training object data" refers to digital data identifying one or more characteristics of an object (e.g., individual) portrayed in a digital training image. In particular, the term "training object data" includes digital data identifying pixels representing an individual portrayed in a digital training image. For example, the term "training object data" includes a ground truth mask reflecting the pixels representing a target individual. Similarly, the term "training object data" includes an object boundary of a target individual portrayed in a digital training image. Moreover, training object data can include a classification corresponding to a target object (e.g., person, animal, machine, etc.).

As shown, the digital segmentation system generates training inputs 204a-204n based on the plurality of training digital images 202a-202n. For example, FIG. 2 illustrates that the digital segmentation system generates the training inputs 204a-204n comprising a plurality of training color channels 206a-206n, a plurality of training position channels 208a-208n, a plurality of training shape input channels 210a-210n, and a plurality of training ground truth masks 212a-212n. The digital segmentation system provides the training inputs 204a-204n to a neural network 214 to generate a trained neural network 216.

The repository 200 can comprise any group or collection of digital visual media items. For instance, in one or more embodiments, the repository 200 comprises a repository of digital images stored on a remote server. For example, in one or more embodiments, the repository 200 comprises the PASCAL VOC segmentation dataset, the MS coco dataset, or another dataset. Furthermore, as mentioned above, the repository 200 includes digital images with training object data where target objects (i.e., the target individuals 218a-218n) have been previously identified.

In one or more embodiments, the digital segmentation system generates the repository 200, or a portion of the repository 200. For instance, in one or more embodiments, the digital segmentation system generates one or more output masks with regard to a probe digital image. The digital segmentation system then adds the probe digital image and generated output mask to the repository 200.

As shown in FIG. 2, the digital segmentation system can generate (or receive) training input from the repository 200. Although FIG. 2 illustrates a particular set, type, and number of training inputs, the digital segmentation system can utilize a variety of training inputs. In particular, training inputs can comprise one or more training color channels, one or more training position channels, one or more training shape input channels, one or more training classifications, and/or any variety of training object data (such as a mask, ground truth mask, or object boundary).

With regard to the embodiment of FIG. 2, the digital segmentation system generates three training color channels (i.e., an R channel, a G channel, and a B channel), two training position channels (i.e., an x-position channel and y-position channel), one training shape input channel, and one training ground truth mask with regard to each training digital image from the repository 200. Thus, with regard to the training digital image 202a, the digital segmentation system generates the training color channels 206a, the training position channels 208a, the training shape input channel 210a, and the training ground truth mask 212a.

In one or more embodiments, the neural network 214 utilizes the training inputs 204a-204n to learn to identify target individuals in probe digital images. In particular, in one or more embodiments the neural network 214 generates an output mask based on one or more training inputs and compares the output mask to a training ground truth mask (or other training object data). For example, with regard the embodiment of FIG. 2, the neural network 214 generates an output mask estimating the pixels corresponding to the target individual 218a based on the training color channels 206a, the training position channels 208a, and the training shape input channel 210a. The neural network 214 then compares the output mask to the training ground truth mask 212a and measures the error between the output mask and the training ground truth mask 212a. The neural network 214 then utilizes the measured error to learn to more accurately generate an output mask with regard to future digital images.

The digital segmentation system can train the neural network 214 with a plurality of digital training images and training inputs. Thus, as illustrated, the digital segmentation system can train the neural network 214 with the training input 204a, the training input 204b, and the training input 204n. By utilizing a plurality of training digital images and training inputs, the digital segmentation system generates the trained neural network 216 such that the trained neural network 216 can accurately select target individuals from probe digital images.

Figure 3:
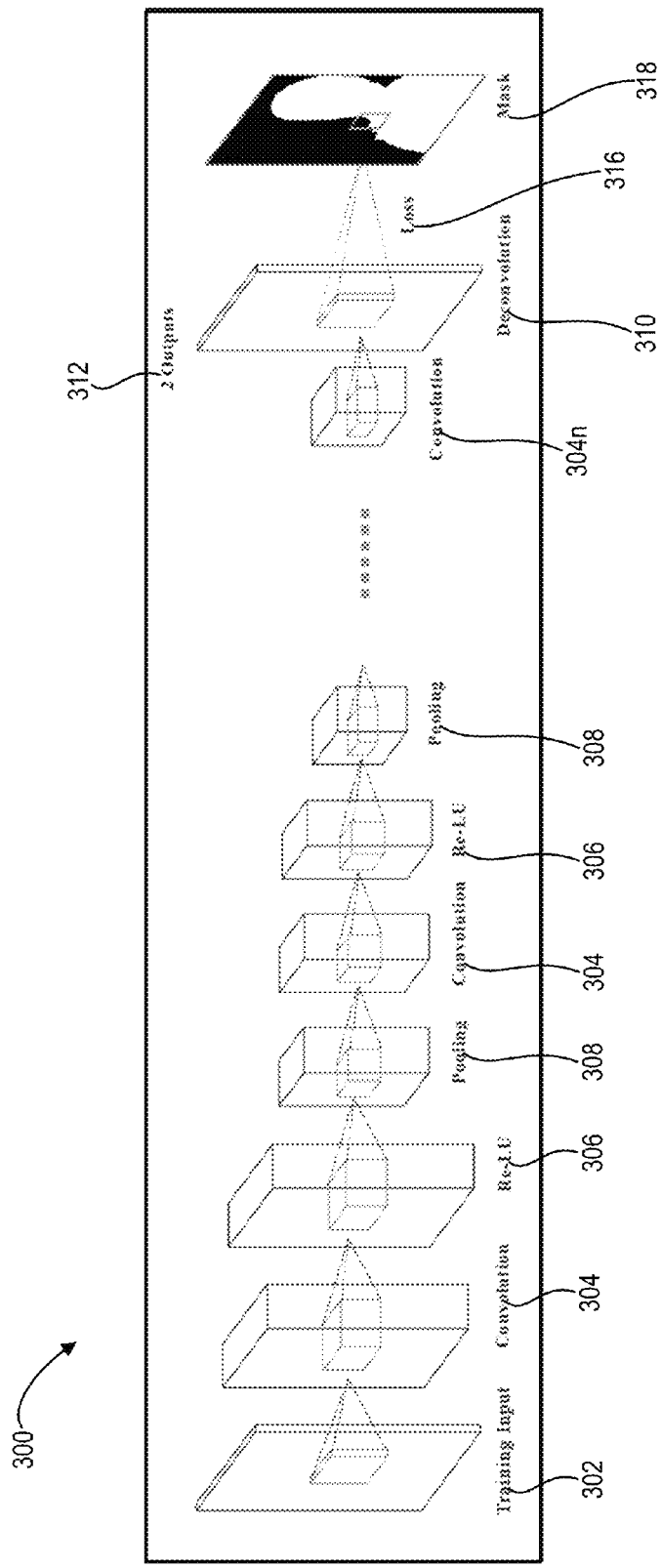
FIG. 3 illustrates a sequence diagram of training a neural network based on the training input in accordance with one or more embodiments.

In one or more embodiments, the digital segmentation system utilizes a fully convolutional neural network. In particular, in one or more embodiments, the digital segmentation system utilizes a fully convolutional network as described in J. Long, E. Shelhamer, & T. Darrell, *Fully Convolutional Networks For Semantic Segmentation*, CVPR, 2014, which is incorporated by reference herein. For example, FIG. 3 illustrates a fully convolutional neural network (FCN) 300 in accordance with one or more embodiments.

As illustrated, the FCN 300 takes training input 302 (e.g., the training input 204a, 204b, or 204n) and through a series of applied layers, generates output 312 (e.g., an output mask). In particular, the FCN 300 utilizes a plurality of convolution layers 304, a plurality of Re—Lu layers 306, a plurality of pooling layers 308, a plurality of deconvolution layers 310, and a loss layer 316. Utilizing these layers, the FCN 300 generates the output 312, which is then measured against a ground truth mask 318 (e.g., the training ground truth mask 212a, 212b, or 212n).

More specifically, the FCN 300 is formulated as a pixel regression problem to the ground-truth labeled mask (e.g., the training ground truth mask 212a, 212b, or 212n). The objective function can be written as, $$\epsilon(\theta) = \Sigma_p e(X_\theta(p), l(p))$$

where p is the pixel index of an image. $X_\theta(p)$ is the FCN regression function in pixel p with parameter $\theta$. The term $e(\_,\_)$ is a loss function which measures the error between the regression output and the ground truth $l(p)$. Different than a general neural network, which only contains the nodes with an activation function, the FCN framework is constructed by layers to fit the regression function. As shown in FIG. 3, these layers are mainly as follows.

Convolution Layer 304: The convolution layer 304 is the basic layer which applies a number of convolutional kernels. The convolutional kernels are trained to extract important features from the images such as edges, corners or other informative region representations.

Re-LU Layers 306: The Re-LU is a nonlinear activation to the input. The function is $f(x)=\max(0, x)$. This nonlinearity helps the network computing nontrivial solutions on the training data.

Pooling Layers 308: The pooling layers 308 compute the max or average value of a particular feature over a region in order to reduce the features' spatial variance. Deconvolution Layer 310: The deconvolution layer 310 learns kernels to upsample the previous layers. This layer is central in making the output of the network match the size of the ground truth after previous pooling layers have downsampled the layer size.

Loss Layer 316: The loss layer 316 measures the error between the output of the network and the ground-truth. For a segmentation labeling task, the loss layer is computed by softmax function.

These layers can generate frameworks for a variety of computer vision tasks such as semantic segmentation, classification, and detection. As described herein, these layers can assist in segmenting pixels representing target individual in a probe digital image from background pixels in the probe digital image.

It will be appreciated that subsequent convolution and pooling layers incrementally trade spatial information for semantic information. While this is desirable for tasks such as classification, it means that information is lost that allows the neural network to learn, for example, that pixels a certain distance from an object, are likely background. Accordingly, in one or more embodiments, the digital segmentation system injects spatial information extracted from a digital image into the FCN. In particular, as mentioned previously, one or more embodiments of the digital segmentation system provide position channels and shape input channels to more accurately locate, select, or otherwise identify target individuals in digital images.

In one or more embodiments, the digital segmentation system trains a neural network utilizing position channels and shape input channels and also utilizing semantic object segmentation (i.e., the digital segmentation system trains a neural network utilizing target objects separated and identified into various classes). For example, in one or more embodiments, the digital segmentation system trains a neural network in multiple stages. Initially, the digital segmentation system trains a neural network utilizing semantic object segmentation, where training digital images include training object data defining target object classes (e.g., animals, persons, etc.). In particular, in one or more embodiments, the digital segmentation system initially trains a neural network utilizing the PASCAL VOC dataset for twenty class object segmentation. Accordingly, the neural network is trained to classify pixels in probe digital images into classes.

The digital segmentation system can then fine-tune the neural network utilizing a repository of digital images. In particular, the neural network can utilize digital images and ground truth masks to further train the neural network. Moreover, the digital segmentation system can change the output so that the digital segmentation system identifies background and foreground (i.e., target individual) pixels (rather than segmenting pixels into various classes). Furthermore, the digital segmentation system can further train the neural network by generating and utilizing training position channels and training shape input channels with regard to the training digital images. In this manner, in one or more embodiments, the digital segmentation system can train a neural network utilizing multiple different training inputs at multiple different stages.

Figure 4A:
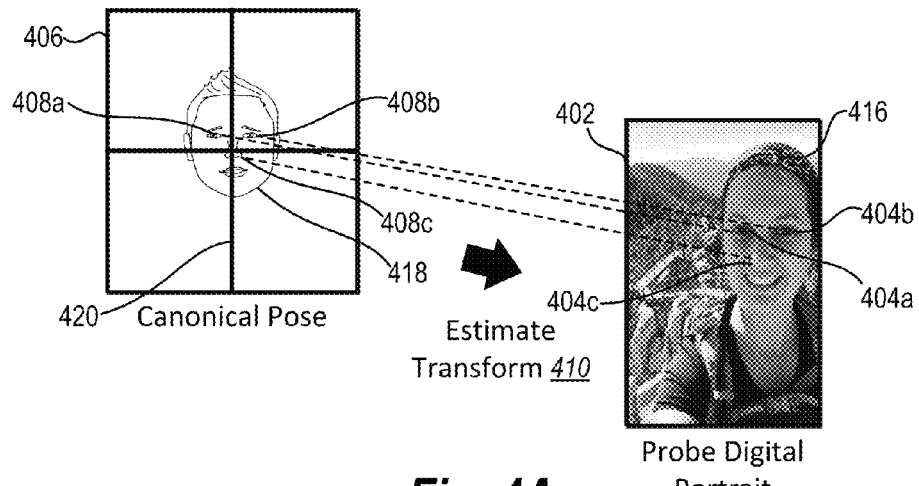
FIG. 4A illustrates a representation of estimating a transform from a digital image in accordance with one or more embodiments.
Figure 4B:
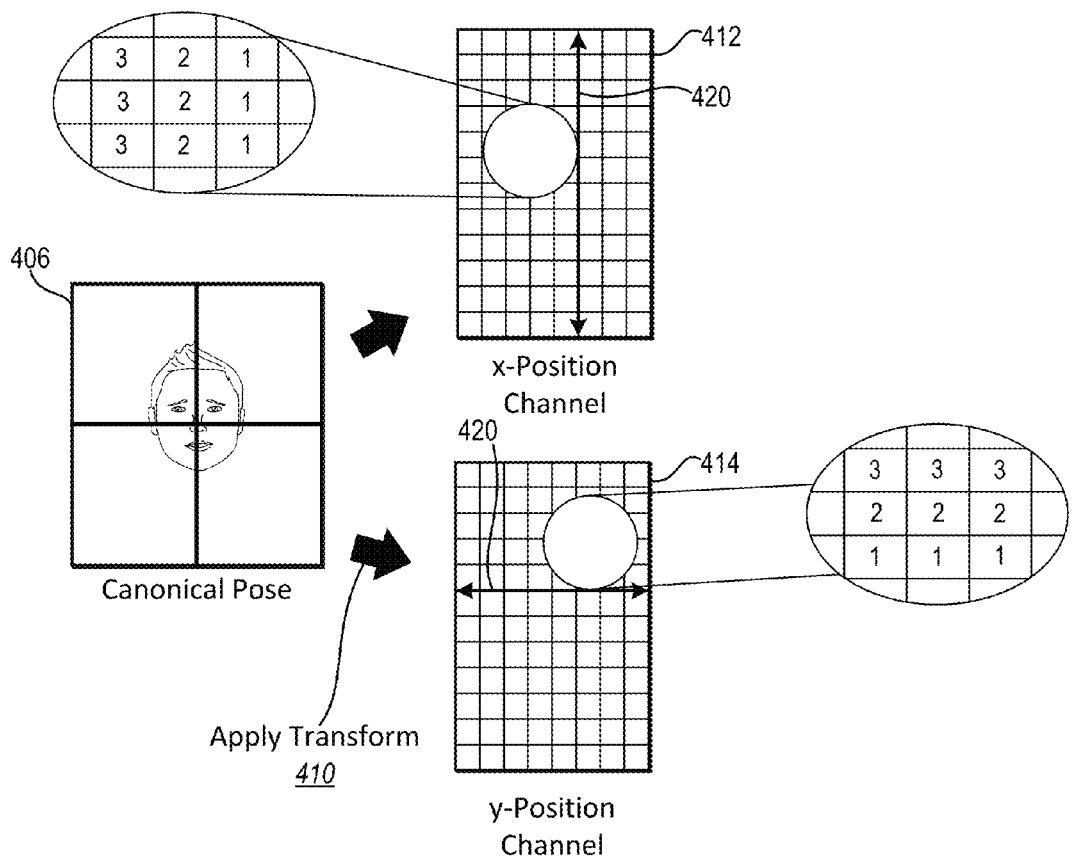
FIG. 4B illustrates a representation of applying the transform of FIG. 4A to generate a position channel in accordance with one or more embodiments.

Turing now to FIGS. 4A-4B additional detail will be provided regarding generating a position channel in accordance with one or more embodiments. The description provided herein can be utilized to generate position channels or training position channels (i.e., position channels generated with regard to probe digital images or training digital images).

As mentioned previously, in one or more embodiments, the digital segmentation system generates normalized position channels by estimating a transform between a canonical pose (i.e., a canonical pose reflecting a template individual, a template face, and/or template facial feature points) and a target individual portrayed in a digital image. More specifically, in one or more embodiments, the digital segmentation system utilizes a robust facial feature detection algorithm to detect features of a target individual (e.g., a face or facial feature points) and generates a transform between the detected features and a canonical pose. Moreover, the digital segmentation system applies the estimated transform to the canonical pose to generate a position channel.

For example, FIG. 4A illustrates a probe digital image 402 portraying a target individual 416. The target individual 416 includes a plurality of identified facial feature points 404a-404c. FIG. 4A illustrates the probe digital image estimating a transform 410 between the canonical pose 406 and the target individual 416. More specifically, FIG. 4A shows that the probe digital image estimates the transform 410 between the canonical pose 406 and the face of the target individual 416 by aligning the facial feature points 404a-404c with the corresponding template facial feature points 408a-408c.

As mentioned, the digital segmentation system can utilize one or more facial feature detectors. For instance, with regard to FIG. 4A, the digital segmentation system applies a facial feature detection algorithm to determine the facial feature points 404a-404c. Specifically, in one or more embodiments, the digital segmentation system utilizes the robust facial feature detector as described in J. Saragih, S. Lucey, & J. F. Cohn, *Face Alignment Through Subspace Constrained Mean-Shifts*, ICCV, 2009 at 1034-1041, which is incorporated herein by reference.

The digital segmentation system can utilize a facial feature detection algorithm to identify a target individual in a digital image. For instance, the facial feature detection algorithm locates a face of a target individual. Similarly, the facial feature detection algorithm can locate one or more facial features (e.g., facial feature points), such as a face center point, eyes, nose, ears, mouth, chin, cheeks, hair, or other facial features. Accordingly, with regard to FIG. 4A, the digital segmentation system applies a facial feature detection algorithm to locate the facial feature points 404a-404c. In particular, the digital segmentation system applies a facial feature detection algorithm to detect the first facial feature point 404a corresponding to a first eye, the second facial feature point 404b corresponding to a second eye, and the third facial feature point 404c corresponding to a center point of the face of the target individual 416.

Although FIG. 4A illustrates three facial feature points 404a-404c (i.e., eyes, facial center point), it will be appreciated that the digital segmentation system can detect any variety or number of points. Thus, for example in one or more embodiments, the digital segmentation system detects and utilizes a greater number of facial feature points depending on the particular embodiment and the number or type of features detected.

As mentioned above, in one or more embodiments, the digital segmentation system generates normalized position channels relative to a standard position, scale, and/or rotation. In particular, in one or more embodiments, the digital segmentation system utilizes a canonical pose and detected facial features in a probe digital image to estimate a transform and generate a normalized position channel. A canonical pose provides a uniform standard reference for analyzing features of a target individual. For example, a canonical pose can provide a template scale, size, and rotation of a face and/or facial features. Thus, in one or more embodiments, the canonical pose allows the digital segmentation system to compare facial features of various target individuals (and various shapes, sizes, and rotations) to a uniform standard.

As mentioned above, a canonical pose can comprise a template digital image with a template individual, face, and/or facial feature points. Moreover, a canonical pose can include a template coordinate system. For example, FIG. 4A illustrates the canonical pose 406, which includes a template face 418 with template facial feature points 408a-408c positioned, scaled, and aligned relative to a template coordinate system 420 (i.e., represented by a horizontal and vertical axis in the canonical pose 406). Specifically, the canonical pose 406 is positioned such that the template face 418 is centered relative to the coordinate system 420 (e.g., the template center facial feature point 408c is aligned at the center of the template coordinate system 420).

In one or more embodiments, the digital segmentation system aligns a target individual to a canonical pose, effectively aligning the target individual to a standard location, scale, and rotation of a template individual. Specifically, the digital segmentation system estimates a transform (e.g., a homography transform) between a canonical pose and a target individual. For example, as illustrated in FIG. 4A, the digital segmentation aligns (i.e., estimates a transform)

between the canonical pose 406 and the target individual 416. In particular, the digital segmentation system estimates a transform that defines changes in position, scale, and rotation to map the template facial feature points 408a-408c in the plane of the canonical pose 406 to the facial feature points 404a-404c in the plane of the probe digital image 402.

Although FIG. 4A illustrates a particular canonical pose 406, it will be appreciated that the digital segmentation system can utilize a canonical pose in a variety of different forms and comprising a variety of different elements. For example, although FIG. 4A illustrates the canonical pose 406 as an image of a face, the digital segmentation system can utilize a matrix, array, or database reflecting particular template feature points for the canonical pose 406. Similarly, although the canonical pose 406 illustrates particular template facial feature points 408a-408c, it will be appreciated that the canonical pose 406 can comprise any variety, type, or number of features.

In one or more embodiments, the digital segmentation system generates a canonical pose (i.e., the canonical pose 406). In particular, in one or more embodiments, the digital segmentation selects a template image to utilize as a canonical pose. The digital segmentation system can utilize facial recognition technology to detect features of an individual portrayed in the template image (e.g., facial feature points) and determine the location of the features within the template image. The digital segmentation system can then utilize the template image as a canonical pose. In particular, the digital segmentation system can estimate a transform between the individual portrayed in the template image and a target individual portrayed in a probe digital image.

As mentioned previously, in addition to estimating a transform between a canonical pose and a target individual, the digital segmentation system also utilizes an estimated transform to generate one or more position channels. For example, FIG. 4B illustrates utilizing an estimated transform to generate a position channel. In particular, FIG. 4B shows the probe digital image applying the transform 410 to the canonical pose 406, resulting in an x-position channel 412 and a y-position channel 414.

As discussed above, the transform 410 reflects changes in location, scale, and rotation to align the canonical pose 406 to the target individual 416. Accordingly, applying the transform 410 to the canonical pose 406 modifies the position, scale, and rotation of the canonical pose 406. In particular, applying the transform 410 modifies the position, scale, and rotation of the canonical pose 406 such that the canonical pose 406 is aligned to the target individual 416. Thus, the transform 410 modifies the canonical pose 406 such that the coordinate system 420 is aligned, scaled, and rotated to the face of the target individual 416.

Upon applying a transform to a canonical pose, the digital segmentation system then determines the position of each transformed pixel of the canonical pose. For example, upon application of the transform 410, the digital segmentation system determines a position (e.g., horizontal and/or vertical position) of pixels in the canonical pose. Because the transform modifies the canonical pose to align to the target individual 416, the transformed pixels of the canonical pose indicate the position of pixels in the probe digital image 402 relative to the target individual 416 (e.g., relative to the center facial point 404c of the target individual 416). Indeed, with regard to the embodiment of FIGS. 4A-4B, upon application of the transform 410, the canonical pose 406 is positioned such that the center facial point 404c is at the center of the coordinate system 420. With the target individual 416 positioned at the center of the coordinate system 420, the digital segmentation system identifies the position of each pixel relative to the target individual 416 by locating each pixel's position on the coordinate system 420.

As mentioned above, upon application of a transform, the digital segmentation system utilizes the position of pixels relative to the target individual to generate one or more position channels. Thus, with regard to FIG. 4B, the digital segmentation determines the position of each pixel in the canonical pose 406 (after application of the transform 410) along the coordinate system 420. The digital segmentation system utilizes the horizontal position of each pixel in the canonical pose 406 along the coordinate system 420 to generate the x-position channel 412. Moreover, the digital segmentation system utilizes the vertical position of each pixel in the canonical pose 406 along the coordinate system 420 to generate the y-position channel 414. Accordingly, the x-position channel 412 and the y-position channel 414 each reflect an array with values corresponding to each pixel in the canonical pose 406 upon application of the transform 410 based on the probe digital image 402. As shown, each value in the array reflects the position (or distance) of pixels in the transformed canonical pose relative to the target individual 416. Moreover, the value of each position (or distance) is scaled according to the size of the target individual 416.

In one or more embodiments, the digital segmentation system utilizes the same canonical pose (i.e., the canonical pose 406) to both train a neural network and use the trained neural network. Thus, for example, the digital segmentation system utilizes the canonical pose 406 to generate training position channels (i.e., position channels utilized to train a neural network, as shown in FIG. 2) and generate position channels utilized to identify target individual in probe digital images (as shown in FIG. 1). Indeed, by using the same canonical pose, in one or more embodiments, the digital segmentation system generates normalized position channels based on the same underlying standard. Accordingly, the neural network more accurately compares position channels (in training an applying a neural network), more accurately learn to identify target individuals from position channels, and more accurately select target individuals portrayed in digital images.

Although FIG. 4B illustrates the x-position channel 412 and the y-position channel 414 as a representation of a grid, matrix, or array, it will be appreciated that the digital segmentation system can generate position channels in a variety of forms. For instance, as illustrated in FIG. 1, the x-position channel 412 and the y-position channel 414 can also be illustrated as grayscale digital images, where the shade of each pixel in the grayscale digital image reflects the position of pixels in the probe digital image relative to a target individual.

Moreover, although FIG. 4A and FIG. 4B illustrates estimating a between a digital image and a canonical pose and applying the transform to the canonical pose, it will be appreciated that in one or more embodiments, the digital segmentation system can utilize a different approach to generate a position channel. For example, in one or more embodiments, the digital segmentation system estimates a transform between a probe digital image and a canonical pose and applies the transform (or the inverse of the transform) to the probe digital rather than the canonical pose. Thus, for example, in one or more embodiments, the digital segmentation system applies the transform 410 (or, more particularly, the inverse of the transform 410) to the probe digital portrait 402 and generates the x-position 412 and the y-position channel 414 utilizing the pixels of the probe digital portrait 402 rather than the pixels of the canonical pose 406. Under either approach, the pixels of the x-position channel and the y-position channel indicate a position (or distance) of pixels of the probe digital image 402 relative to the target individual 416 (e.g., the face of the target individual 416).

Figure 5A:
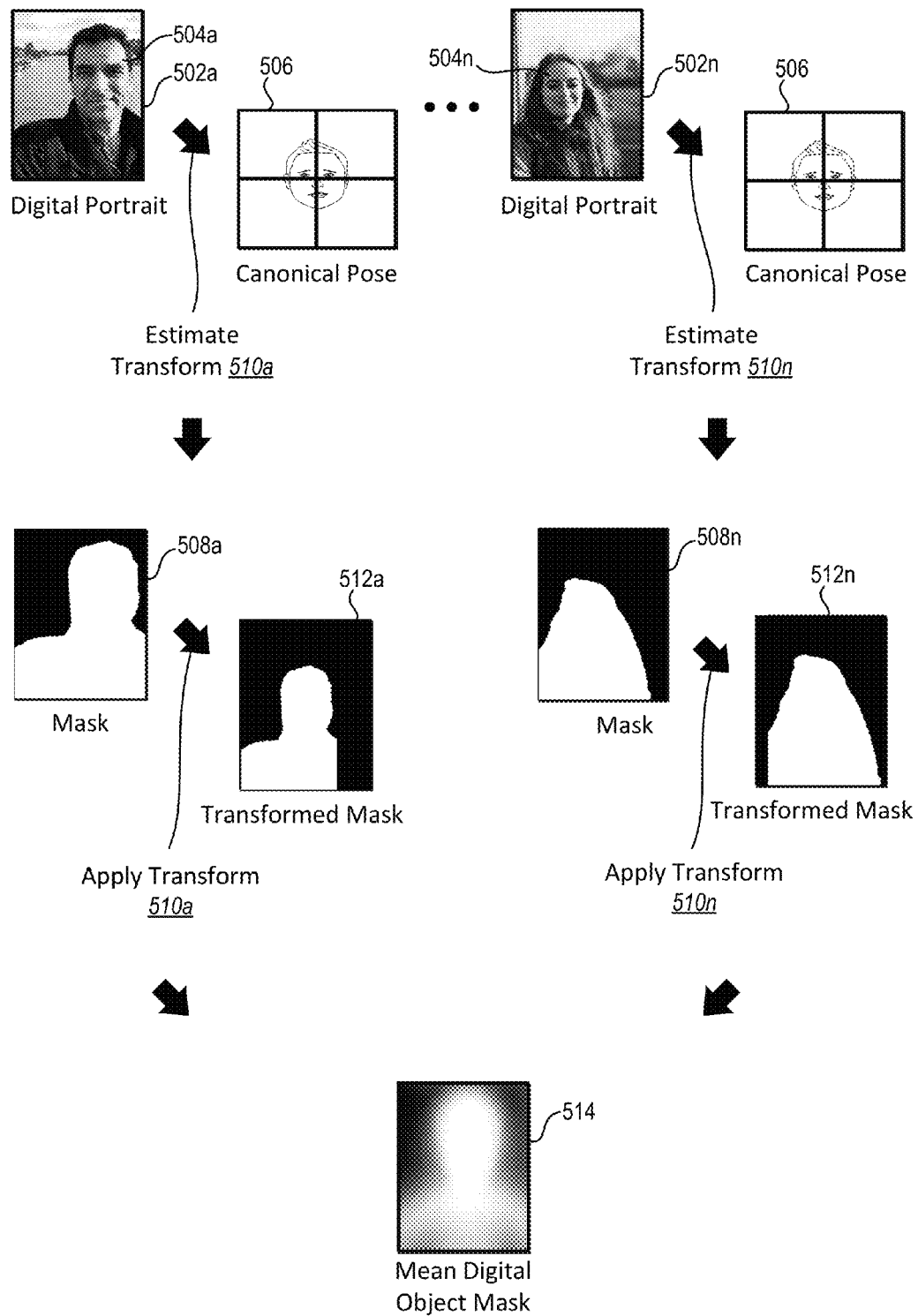
FIG. 5A illustrates a representation of generating a mean digital object mask in accordance with one or more embodiments.
Figure 5B:
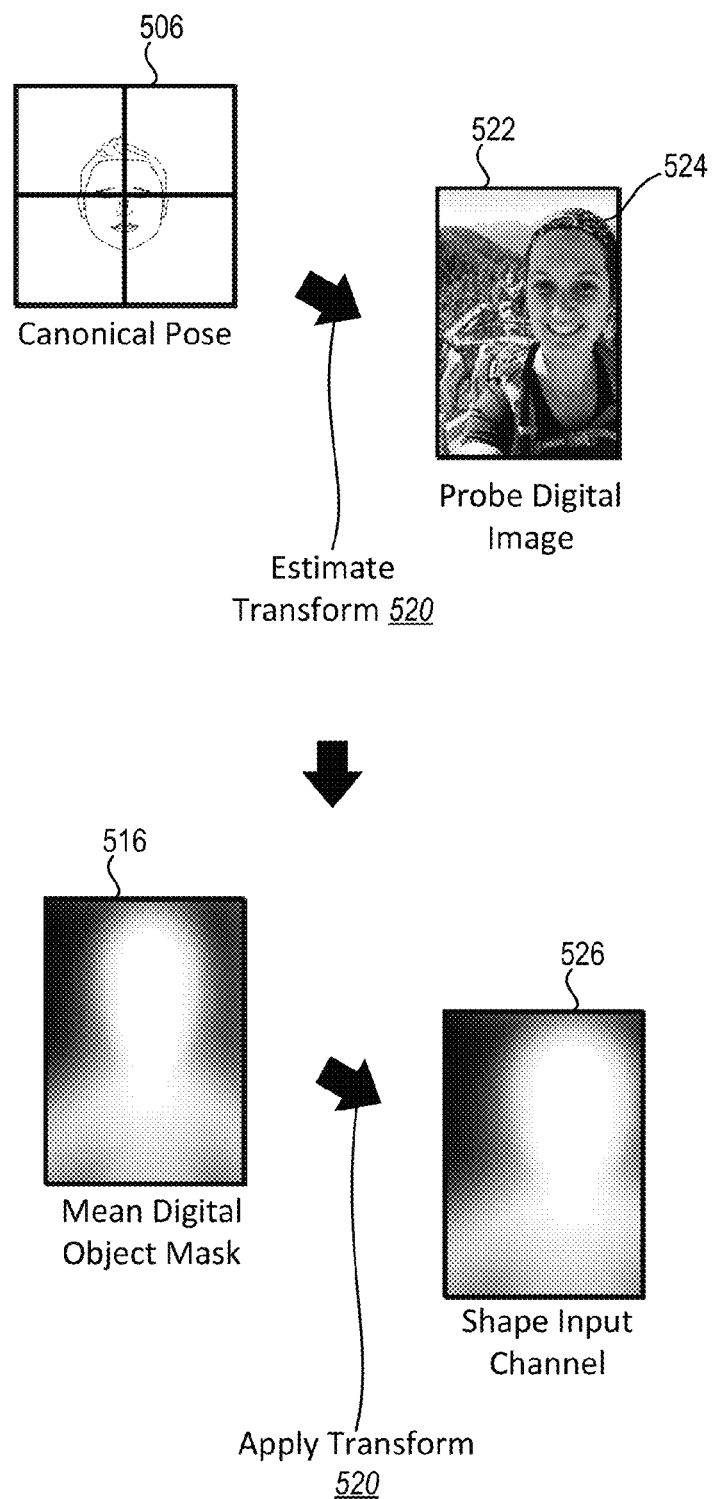
FIG. 5B illustrates a representation of utilizing the mean digital object mask of FIG. 5A to generate a shape input channel in accordance with one or more embodiments.

Turning now to FIGS. 5A-5B, additional detail will be provided regarding generating shape input channels. In particular, FIG. 5A illustrates generating a mean digital object mask in accordance with one or more embodiments, and FIG. 5B illustrates utilizing a mean digital object mask to generate a shape input channel in accordance with one or more embodiments.

As mentioned above, the digital segmentation system generates a mean digital object mask that reflects the shapes of a plurality of individuals portrayed in a plurality of digital images. FIG. 5A illustrates a plurality of digital images 502a-502n portraying individuals 504a-504n. As shown in FIG. 5A, the digital segmentation system generates a mean digital object mask 514 from the plurality of digital images 502a-502n. In particular, as shown, the digital segmentation system estimates transforms 510a-510n between the individuals 504a-504n and a canonical pose 506 (i.e., the canonical pose 406). Moreover, the digital segmentation system applies the transforms 510a-510n to masks 508a-508n (i.e., masks corresponding to the digital images 502a-502n), generating transformed masks 512a-512n (i.e., masks aligned to a uniform position, scale, and rotation). The digital segmentation system then combines the transformed masks 512a-512n to generate the mean digital object mask 514, which reflects the shape of each of the individuals 504a-504n.

The digital segmentation system can access the digital images 502a-502n and the corresponding masks 508a-508n from a variety of sources. For example, in one or more embodiments, the digital segmentation system accesses the digital images 502a-502n and the masks 508a-508n from the repository 200 of training digital images (e.g., the digital images 502a-502n and the masks 508a-508n correspond to the training digital images 202a-202n and the ground truth masks 212a-212n). In one or more embodiments, the digital segmentation system generates the digital images 502a-502n and the masks 508a-508n.

As illustrated in FIG. 5A, upon accessing the digital images 502a-502n, the digital segmentation system estimates the transforms 510a-510n between the individuals 504a-504n portrayed in the digital images 502a-502n and the canonical pose 506. The process of estimating a transform was described previously with regard to FIGS. 4A-4B. In short, with regard to the embodiment of FIG. 5A, the digital segmentation system utilizes a facial recognition detection algorithm to detect features of the individuals 504a-504n. The facial detection system then estimates the transforms 510a-510n between the detected features and corresponding features of the canonical pose 506. Accordingly, the transforms 510a-510n describe modifications in position, scale, and rotation to align the individuals 504a-504n to the canonical pose 506.

As shown in FIG. 5A, the digital segmentation system then applies the transforms 510a-510n to the masks 508a-508n corresponding to the digital images 502a-502n. In particular, the digital segmentation system applies the transforms 510a-510n to generate the transformed masks 512a-512n. Because the digital segmentation system estimates the transforms 510a-510n based on aligning the individuals 504a-504n to the canonical pose 506, the transformed masks 512a-512n are each positioned, scaled, and rotated based on the canonical pose 506. In other words, the transformed masks 512a-512n reflect the shape of the corresponding individuals 504a-504n relative to a common position, scale, and rotation defined by the canonical pose 506.

In one or more embodiments, the digital segmentation system generates a mean digital object mask that combines the shape of a plurality of individuals. Thus, as shown in FIG. 5A, the digital segmentation system combines the transformed masks 512a-512n to generate the mean digital object mask 514. Specifically, with regard to the embodiment of FIG. 5A, the digital segmentation system assigns a value to each pixel in the transformed mask 512a-512n representing an individual (e.g., a value of 1) and assigns another value to each pixel in the transformed masks 512a0512n representing background (e.g., a value of 0). For each pixel location, the digital segmentation system then calculates an average value across the plurality of transformed masks.

Thus, for example, the digital segmentation system analyzes the pixel in the upper-left corner of each transformed mask 512a-512n. As shown, the upper-left corner of each transformed mask 512a-512n is a background pixel (i.e., does not represent an individual). Accordingly the digital segmentation system determines a value of zero for each pixel in the upper-left corner of each transformed mask 512a-512n and averages the values together. The resulting value (i.e., 0) is then utilized as the value for the upper-left corner of the mean digital object mask.

Similarly, the digital segmentation system analyzes the pixel in the lower-left corner of each transformed mask 512a-512n. The digital segmentation system determines that the lower-left pixel in transformed mask 512a reflects the individual 504a and assigns a value of 1. The digital segmentation system determines that the lower-left pixel in the transformed mask 512n reflects the background and accordingly, assigns a value of zero. The digital segmentation system then averages these values (1 and 0) and utilizes the resulting value (0.5) as the lower-left value in the mean digital object mask 514.

It will be appreciated that although the embodiment of FIG. 5A has been described with regard to particular values (e.g., 0 or 1) and mathematical constructs (i.e., an average) for generating the mean digital object mask 514, other embodiments utilize different values and different mathematical constructs. For example, rather than calculating an average, one or more embodiments calculate a median or mode value. Moreover, in one or more embodiments, the digital segmentation system employs a clustering algorithm (such as k-means clustering) to identify mean digital object mask (e.g., identify the largest cluster of pixels from the transformed masks 512a-512n and exclude smaller clusters). In addition, in one or more embodiments, the digital segmentation system applies a filter (such as RANSAC) to remove outliers and more clearly define the mean digital object mask 514.

Similarly, in one or more embodiments, the digital segmentation system applies an object mask threshold to further define the mean digital object mask. For example, the digital segmentation system can filter the mean digital object mask 514 and replace values less than the object mask threshold (e.g., 0.25) with another value (e.g., 0). In this manner, the digital segmentation system can more clearly define a mean shape corresponding to the plurality of individuals 504a-504n.

In addition, it will be appreciated that in generating transformed masks, one or more pixels originally included in a digital image may no longer be included within a transformed mask or be reflected in a mean digital object mask. For example, with regard to the transformed mask 512a, the transform 510a has shifted the mask 508a to the left, such that a portion (i.e., a portion of the should and arm) of the individual 504a falls outside the boundaries of the digital image and is no longer represented in the transformed mask 512a. In one or more embodiments, the digital segmentation system discards portions of a mask that fall outside the boundaries of a digital image.

The mean digital object mask 514 can take a variety of forms. As shown in FIG. 5A, the mean digital object mask 514 comprises a grayscale image where the shade of each pixel corresponds to the resulting value upon averaging the transformed masks 512a-512n. In particular, the higher the value (i.e., the closer to 1), the lighter the shade and the lower value (i.e., the closer to 0) the darker the shade. It will be understood that the mean digital object mask 514 can be represented in a variety of other forms, such as a matrix, array, spreadsheet, database, collection of pixels, or other digital item.

As shown, the mean digital object mask 514 reflects the average shape of the plurality of individuals 504a-504n in the plurality of digital images 502a-502n. In particular, the mean digital object mask 514 reflects the average of the masks 508a-508n corresponding to the plurality of digital images 502a-502n, where the masks have been aligned to a common position, scale, and rotation.

As mentioned, in one or more embodiments, the digital segmentation system utilizes a mean digital object mask to generate one or more shape input channels. The digital segmentation system can utilize a mean digital object mask to generate training shape input channels (i.e., training shape input channels utilized to train a neural network, as shown in FIG. 2) or other shape input channels utilized as input to a trained neural network to identify a target individual portrayed in a probe digital image (as shown in FIG. 1). FIG. 5B illustrates utilizing the mean digital object mask 514 to generate a shape input channel 526 with regard to a probe digital image 522 portraying a target individual 524. In particular, FIG. 5B illustrates the digital segmentation system estimating a transform 520 between the canonical pose 506 and the target individual 524. Moreover, FIG. 5B illustrates the digital segmentation system applying the estimated transform 520 to the mean digital object mask 514 to generate the shape input channel 526. It will be appreciated that a similar approach can be utilized to generate a training shape input channel with regard to an individual represented in a training digital image (e.g., the training shape input channel 210a).

The digital segmentation system estimates the transform 520 between the canonical pose 506 and the target individual 524 utilizing similar techniques previously described. In short, the digital segmentation system utilizes a facial feature detection algorithm to locate one or more features of the target individual 524 and then estimates the transform 520 between the canonical pose 506 and the corresponding detected features. Accordingly, the transform 520 defines modifications in position, scale, and rotation to align the canonical pose 506 to the target individual 524 (and vice versa).

In one or more embodiments, the digital segmentation system utilizes an estimated transform between a canonical pose and a target individual to align a mean digital object mask to the target individual. In this manner, the digital segmentation system can generate a shape input channel. For example, as shown in FIG. 5B, the digital segmentation system applies the transform 520 to the mean digital object mask 514. Because the mean digital object mask 514 was generated (as described with regard to FIG. 5A) to align the canonical pose 506 to the target individual 524, the transform 520 defines modifications in position, scale, and rotation to align the mean digital object mask 514 to the target individual 524. Accordingly, applying the transform 520 to the mean digital object mask 514 aligns the mean digital object mask 514 to the position, scale and rotation of the target individual 524, generating the shape input channel 526.

As mentioned previously with regard to position channels, in one or more embodiments, the digital segmentation system utilizes the same canonical pose (e.g., the canonical pose 506) to both train a neural network and apply a trained neural network. In particular, the digital segmentation system can utilize the same canonical pose to generate training shape input channels (e.g., the training shape input channels 210a-210n) and shape input channels from probe digital images (e.g., the shape input channel 104). Indeed, by utilizing shape input channels aligned to the same underlying standard, the digital segmentation system can more accurately train and utilize a neural network to select target individuals in probe digital images.

As shown, the shape input channel 526 estimates the shape of the target individual 524. In particular, the shape input channel 526 estimates the shape of the target individual based on the shapes of a plurality of individuals represented in other digital images. The shape input channel 526 thus provides spatial information regarding the position, shape, and rotation of the target individual 524 in the probe digital image 522. As outlined previously, the shape input channel 526 can then be provided to a trained neural network to increase the accuracy of the trained neural network in selecting the target individual 524 from the probe digital image 522.

In addition to the previous description, the embodiments of FIGS. 5A-5B can also be described in terms of mathematical equations or algorithms. For example, consider a set of image-mask pairs $\{P^i, M^i\}$, where $P^i$ is the set of pixels in the image and where $M^i$ is the set of pixels in the mask corresponding to the individual portrayed in the image. The digital segmentation system generates a mean digital object mask, M, by $$M = \frac{\sum_i w_i \circ \mathcal{T}_i(M^i)}{\sum_i w_i}$$

where $w_i$ is a matrix indicating whether the pixel in M is outside the image after the transform $\tau_i$. The value of $w_i$ is 1 if the pixel is inside the image, otherwise, it is set as 0. The operator · denotes element-wise multiplication. The mean digital object mask, M, which has been aligned to a canonical pose, can then be similarly transformed to align with the facial feature points of a probe digital image. In one or more embodiments, the digital segmentation system generates shape input channels to utilize in selecting target individuals from probe digital images.

Utilizing position channels and shape input channels in conjunction with a trained neural network, the digital segmentation system can accurately select target individuals from probe digital images, including probe digital images with a variety of different characteristics or features. Indeed, the digital segmentation system can select target individuals regardless of scale, rotation, position, color, or occlusion.

Figure 6:
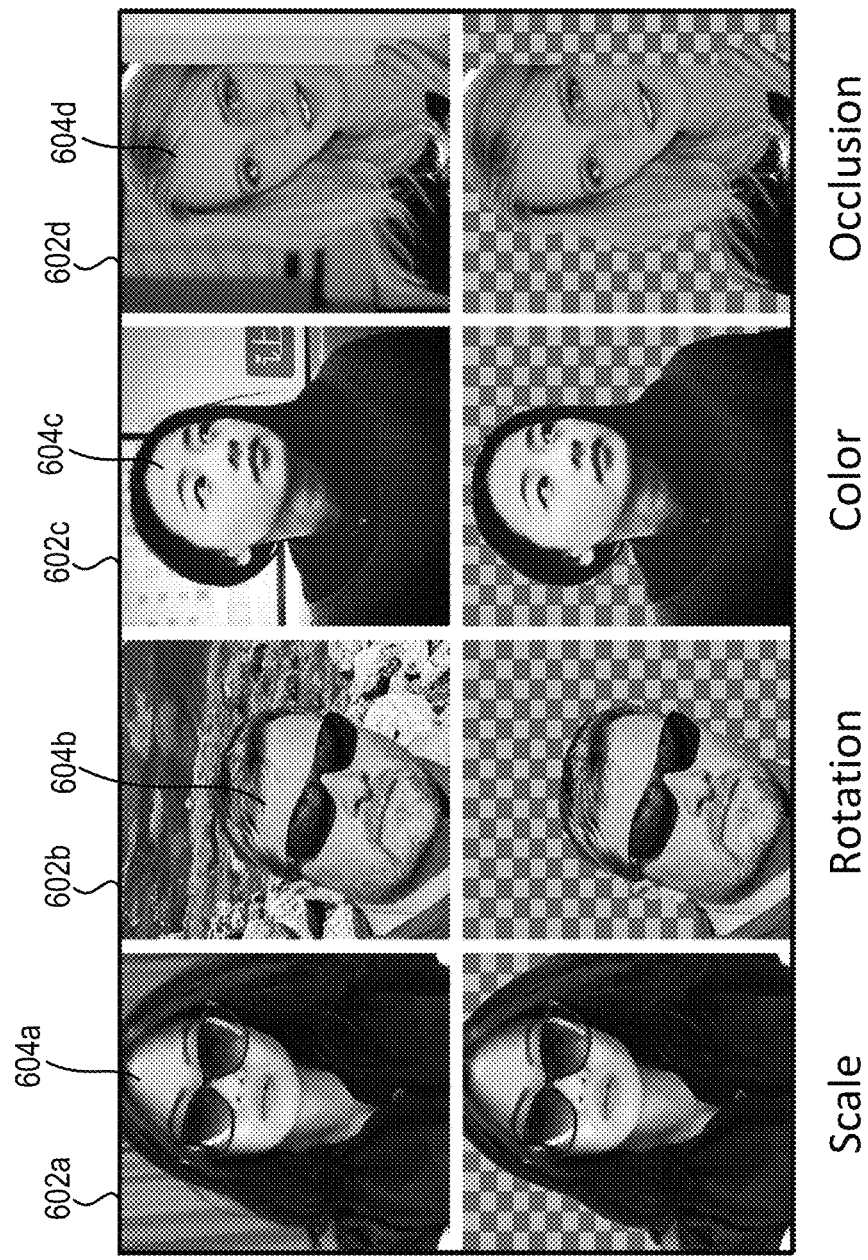
FIG. 6 illustrates a representation of selecting target individuals in accordance with one or more embodiments.

For example, FIG. 6 illustrates a plurality of digital images 602a-602d portraying target individuals 604a-604d. As shown in the bottom row of FIG. 6, the digital segmentation system selects the target individuals 604a-604d, despite differences in scale, rotation, position, color (e.g., color, gray scale, or black and white images), and occlusion with regard to each digital image.

Moreover, as mentioned previously, the digital segmentation system automatically selects the target individuals 604a-604d from the digital images 602a-602d. Indeed, the digital segmentation system selects the target individuals 604a-604d without user input of areas, boundaries, or points. Thus, for example, the digital segmentation system selects the target individual 604b without user input (i.e., tracing) of a boundary around the target individual 604b, without user input (e.g., a mouse click) of a point or pixel within the target individual 604b, or any other user input identifying the target individual 604b. In one or more embodiments, the digital segmentation system detects user input of a request to select a target individual in a digital image and, in response, automatically selects the target individual.

Upon selecting a target individual, the digital segmentation system treats the target individual independently of background pixels. For example, the digital segmentation system can modify a selected individual independently of background pixels. Thus, in one or more embodiments, upon selecting a target individual the digital segmentation system can replace the background in a probe digital image. For instance, the probe digital image can replace the background pixels with different background pixels to give the appearance that a target individual is in a different location.

Figure 7:
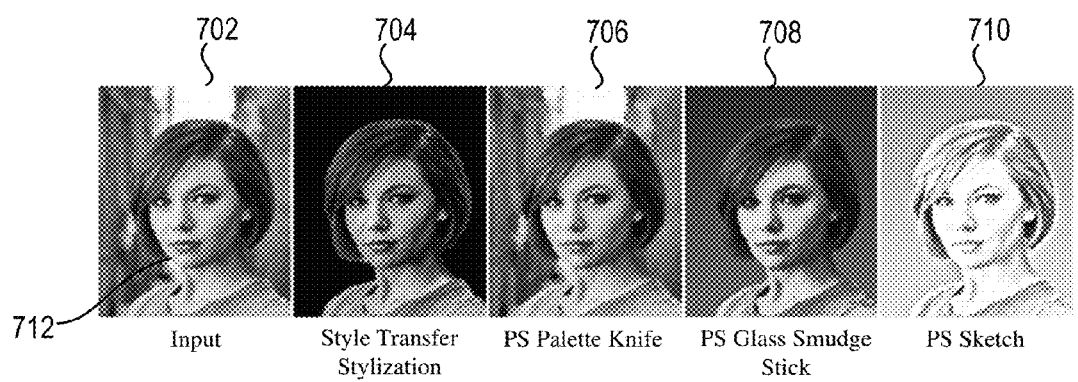
FIG. 7 illustrates digital images upon applying of a variety of modifications in accordance with one or more embodiments.

Similarly, the digital segmentation system can apply filters (i.e., various stylizations) to a target individual independently of background pixels. For example, FIG. 7 illustrates a variety of image filters that differentiate the target individual from the background. In particular, FIG. 7 illustrates a probe digital image 702 portraying a target individual 712 as originally input into a trained neural network. FIG. 7 also illustrates stylized images 704-710 after selection of the target individual 712. In particular, the stylized images 704-710 illustrate the probe digital image 702 after application of a variety of styles (as labeled), including style transfer stylization, PS Palette Knife, PS Glass Smudge Stick, and PS Sketch. The digital segmentation system can apply any type or variety filters, including those illustrated in FIG. 7, depth-of-field, PS Fresco, or other filters or styles.

As illustrated, the digital segmentation system can apply filters or styles to a target individual independently of background pixels. Thus, for example, the digital segmentation system can apply a course-scale filter on background pixels and apply a finer-scale filter on a target individual in order to make the target individual stand out. Similarly, the digital segmentation system can apply a filter to background pixels without applying the filter to the target individual (or vice versa).

The digital segmentation system can apply a variety of other modifications with regard to a selected target individual. For example, the digital segmentation system can move, rotate, resize, cut, copy, or paste a target individual. Similarly, the digital segmentation can adjust the appearance of a target individual (e.g., adjust color, hue, shading, brightness, etc.).

In addition to modifying a digital image, the digital segmentation system can also be utilized to assist with other computer graphics and vision tasks. For example, by limiting the area under analysis to a target individual, the digital segmentation system can be utilized to assist in 3D face reconstruction, face view synthesis, and image style transfer.

As mentioned above, the digital segmentation system provides increased accuracy in selected target individuals with less time and user interaction. To illustrate, one or more advantages of the digital segmentation system, experimenters have conducted research to show that the digital segmentation system produces more accurate selections while automatically selecting target individuals. In particular, experimenters trained a neural network in accordance with one or more embodiments of the digital segmentation system, utilized the neural network to select individuals in digital images, utilized other object selection systems to select individuals in digital images, and compared the results obtained from other object selection systems and the digital segmentation system.

Specifically, experimenters collected 1800 portraits including individuals and manually labeled the images (i.e., identified individuals portrayed in the images by generating an object truth mask for each individual). Experimenters captured a range of image types, but biased the collection to selfies captured with mobile front-facing cameras (i.e., the most difficult, and most common scenario). The images were cropped to 600×800 according to the bounding box of a face detection result. The digital image selected include large variations in age, color, background, clothing accessories, head position, hair style, etc. Experimenters included such large variations in the dataset to make the model more robust in the face of similarly challenging inputs. Experimenters split the 1800 labeled images into a 1500 image training dataset and a 300 image testing/validation dataset. Because more data tends to produce better results, experimenters augmented out training dataset by perturbing the rotations and scales of the original training images. Experimenters synthesized four new scales {0.6, 0.8, 1.2, 1.5} and four new rotations {−45°, −22°, 22°, 45° }. Experimenters also applied four different gamma transforms to get more color variation. The gamma values are {0.5, 0.8, 1.2, 1.5}. After the modifications, experimenters obtained over 19,000 training images.

Experimenters began with an FCN-8s model which had been pre-trained on the PASCAL VOC 2010 20-class dataset (i.e., a repository of digital images with known classifications). Experimenters fine-tuned the entire network because the pre-trained model does not contain weights for the aligned mean digital object mask and x- and y-channels in the first convolutional layer. Experimenters initialized these unknown weights with random values and fine-tuned with a learning rate of 1e-04. This learning rate was arrived at by trying several rates and visually inspecting the loss.

Based on the labeled 300 testing images, experimenters quantitatively compared experimental embodiments of the digital segmentation system with other methods. In particular, experimenters measure segmentation error by the standard metric of IoU accuracy, which is computed as the area of intersection of the output with the ground-truth, divided by the union of their areas. Experimenters compared the digital segmentation system with an automatic graph-cut method and with a fully convolutional network (FCN-8s) generated with a person class (i.e., ignoring the remaining 19 class object labels in the PASCAL VOC 2010 20-class dataset). Experimenters identified substantial performance improvements over other segmentation methods.

Figure 8:
FIG. 8 illustrates results from experimentation conducted with regard to one or more embodiments.

FIG. 8 illustrates sample results of the experiment with regard to four input images. In particular FIG. 8 illustrates the input images, the ground truth corresponding to the target individuals portrayed in the input images, and the results utilizing the FCN-8s model, the graph-cut model, and the digital segmentation system utilizing both position channels and shape input channels. As illustrated, for these four images application of the digital segmentation system resulted in the highest accuracy.

Other results of the experimentation further indicate that the digital segmentation system outperformed other segmentation models. Indeed, as illustrated in Table 1, on average, an embodiment of the digital segmentation system utilizing a fully convolutional neural network trained with shape input channels and position channels resulted in 95.91% IoU accuracy, compared with 73.09% resulting from a fully convolutional neural network trained with digital images (from the PASCAL VOC person classification).

TABLE 1

| Methods | IoU Accuracy |
| --- | --- |
| Graph-cut | 80.02% |
| FCN (Person Class) | 73.09% |
| PortraitFCN (FCN trained with digital portraits) | 94.20% |
| Digital segmentation system (Shape Input Channels and Position Channels) | 95.91% |

In sum, the digital segmentation system provides improved accuracy with fewer user interactions over other object selection systems. The digital segmentation system achieves these results by utilizing a neural network trained with training position channels and/or training shape input channels to select target individuals.

Figure 9:
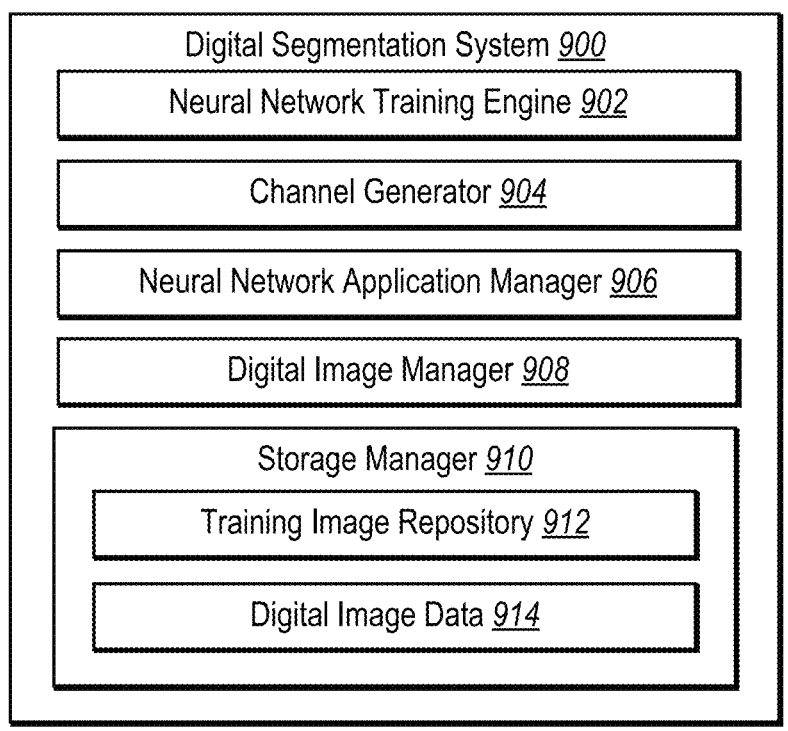
FIG. 9 illustrates a schematic diagram of a digital segmentation system in accordance with one or more embodiments.

Turning now to FIG. 9, additional detail will be provided regarding components and capabilities of one example architecture of a digital segmentation system according to one or more embodiments. In particular, FIG. 9 illustrates an embodiment of an exemplary digital segmentation system 900 (e.g., "digital segmentation system," described above). As shown, the digital segmentation system 900 may include, but is not limited to, a neural network training engine 902, a channel generator 904, a neural network application manager 906, a digital image manager 908, and a storage manager 910. Moreover, the storage manager 910 may also include training image repository 912 and digital image data 914.

As just mentioned, and as illustrated in FIG. 9, the digital segmentation system 900 includes the neural network training engine 902. The neural network training engine 902 can teach, guide, tune, and/or train one or more neural networks. In particular, the neural network training engine 902 can train a neural network based on a plurality of digital training images (e.g., images from the training image repository 912). More specifically, the neural network training engine 902 access, identify, generate, create, and/or determine training input and utilize the training input to train a neural network.

The neural network training engine 902 can train any type or variety of neural network (e.g., a variety of machine learning algorithms). As discussed above, in one or more embodiments, the neural network training engine 902 trains a convolutional neural network (CNN) and/or fully convolutional neural network (FCN) to select target individuals in digital images.

The neural network training engine 902 can generate or access a variety of types of training input. For instance, the neural network training engine 902 accesses one or more training position channels or one or more training shape input channels (e.g., from the channel generator 904). Similarly, the channel generator 904 generates one or more color channels (e.g., from the channel generator 904).

Moreover, the channel generator 904 generates and/or accesses training object data. For instance, the channel generator 904 accesses one or more masks. In particular, in one or more embodiments, the channel generator 904 accesses ground truth masks corresponding to training digital images. Similarly, the channel generator 904 accesses classification data corresponding to one or more training digital images or target objects.

As mentioned, the neural network training engine 902 trains a neural network utilizing training input. In particular, the neural network training engine 902 trains a neural network based on identified and/or generated training input, such as color channels, position channels, shape input channels, ground truth object masks, classifications, or other training object data.

As described above, in one or more embodiments, the neural network training engine 902 trains a neural network based on digital images with one or more classifications (e.g., digital images with target objects classified as persons). In one or more embodiments, the neural network training engine 902 can train a neural network with digital images that are unclassified.

In addition to the neural network training engine 902, as shown in FIG. 9, the digital segmentation system 900 also includes the channel generator 904. The channel generator 904 can access, identify, generate, and/or create one or more channels, including color channels, position channels, and/or shape input channels. For instance, the channel generator 904 generates training position channels and/or training shape input channels with regard to digital training images for the neural network training engine 902. Similarly, the channel generator 904 creates position channels and/or training shape input channels with regard to a probe digital image for the neural network application manager 906.

As just mentioned, in one or more embodiments the channel generator 904 creates one or more color channels. In particular, the channel generator 904 generates color channels reflecting the color of each pixel in a digital image. Specifically, in one or more embodiments, the channel generator 904 creates a red color channel, a green color channel, and a blue color channel. In other embodiments, the channel generator 904 creates four color channels (e.g., in analyzing a CMYK image, utilizing a color channel for cyan, magenta, yellow, and black). Similarly, in one or more embodiments, the channel generator 904 creates a single color channel (e.g., in analyzing a gray scale image).

In addition, in one or more embodiments the channel generator 904 creates position channels. In particular, the channel generator 904 can generate position channels that reflect the position (or distance) of pixels in a digital image relative to a target individual portrayed in a digital image (e.g., relative to a face of a target individual). Specifically, in one or more embodiments, the channel generator 904 generates position channels by estimating a transform between a canonical pose (i.e., a template digital image portraying a template individual or template face) and a target individual. The channel generator 904 utilizes the estimated transform to generate a position channel with values reflecting the position (or distance) of pixels in a digital image relative to a target individual portrayed in the digital image and scaled according to the size of the target individual (e.g., the size of the individual's face).

In one or more embodiments, the channel generator 904 generates a plurality of position channels. For example, the channel generator 904 generates an x-position channel (reflecting horizontal position or horizontal distance relative to a target individual) and a y-position channel (reflecting vertical position or vertical distance relative to a target individual).

In addition to position channels, in one or more embodiments the channel generator 904 creates shape input channels. In particular, the channel generator 904 creates shape input channels that reflect the shape of a plurality of individuals reflected in a plurality of other digital images. For example, the channel generator 904 generates a mean digital object mask that combines ground truth masks of a plurality of digital images. Moreover, the channel generator 904 aligns the mean digital object mask to a target individual portrayed in a probe digital image (e.g., by estimating and applying one or more transforms). In this manner, the channel generator 904 can generate a shape input channel that estimates the shape of a target individual portrayed in a digital image, based on ground truth masks from a plurality of other digital images.

As illustrated in FIG. 9, the digital segmentation system 900 also includes the neural network application manager 906. The neural network application manager 906 can access, utilize, or apply a trained neural network (e.g., apply a trained neural network from the neural network training engine 902). For instance, the neural network application manager 906 applies a trained neural network to a probe digital image and select a target individual portrayed in the probe digital image.

The neural network application manager 906 utilizes any trained neural network. For example, in one or more embodiments, the neural network application manager 906 utilizes a trained neural network generated by the neural network training engine 902. Thus, in one or more embodiments, the neural network application manager 906 utilizes a fully convolutional neural network to generate information that enables selection of a target individual.

In one or more embodiments, the neural network application manager 906 provides color channels, position channels, and/or shape input channels corresponding to a probe digital image (e.g., channels received from the channel generator 904) to a trained neural network. Based on the color channels, position channels, and/or shape input channels, the neural network application manager 906 selects a target individual portrayed in the digital image.

For example, in one or more embodiments, the neural network application manager 906 generates a selection score map. The selection score map reflects the probability that pixels in a probe digital image correspond to a target individual. Moreover, in one or more embodiments, the neural network application manager 906 utilizes the selection score map to select a target individual portrayed in the digital image. For example, the neural network application manager 906 applies a threshold to the selection score map to identify a set of pixels that represent the target individual in a digital image.

Similarly, the neural network application manager 906 can utilize one or more matting algorithms to select a target individual. For example, in one or more embodiments, the neural network application manager 906 utilizes a selection score map to generate a trimap (e.g., a map that divides pixels into three categories, such as background, unknown, and target individual). Moreover, the neural network application manager 906 utilizes the trimap in conjunction with a KNN matting algorithm to select a target individual.

In addition to a selection score map, the neural network application manager 906 can generate a variety of outputs. For example, the neural network application manager 906 generates a set of pixels representing a target individual in a probe digital image. Similarly, the neural network application manager 906 can generate an output mask, an object boundary, or some other output.

Furthermore, as illustrated in FIG. 9, the digital segmentation system 900 also includes the digital image manager 908. The digital image manager 908 can access, identify, modify, revise, and/or provide digital images. Furthermore, the digital image manager 908 can receive selection information identifying a target individual (e.g., from the neural network application manager 906) and modify the digital image (e.g., the target individual or background pixels).

In particular, the digital image manager 908 can modify digital images or a portion of a digital image. For example, in one or more embodiments, the digital image manager 908 alters color, brightness, hue, or any other visual characteristic of a target individual (or background). Similarly, the digital image manager 908 can move, resize, rotate, or orient a target individual portrayed in a digital image. Similarly, the digital image manager 908 can isolate, cut, and paste a target individual portrayed in a digital image. Moreover, the digital image manager 908 can delete or remove a target individual (or background) in a digital image.

The digital image manager 908 can also apply one or more filters or styles to a digital image. More specifically, the digital image manager 908 can independently apply one or more filters or styles to a target individual. Thus, for example, the digital image manager 908 can apply a first filter to a target individual and apply a second filter to background pixels in a digital image.

As illustrated in FIG. 9, the digital segmentation system 900 also includes the storage manager 910. The storage manager 910 maintains data for the digital segmentation system 900. The storage manager 910 can maintain data of any type, size, or kind as necessary to perform the functions of the digital segmentation system 900. The storage manager 910, as shown in FIG. 9, includes the training image repository 912. The training image repository 912 can include a plurality of digital training images (e.g., digital training portraits). In particular, in one or more embodiments, the training image repository 912 includes digital training images utilized by the neural network training engine 902 to train one or more neural networks. Similarly, the training image repository 912 can include digital images utilized by the channel generator 904 to generate one or more mean digital object masks. The training image repository 912 can include any type or variety of digital image.

In addition to digital images, the training image repository 912 can also include training object data. For example, the training image repository 912 includes training object data with regard to target individuals. Specifically, the training image repository 912 can include object boundaries or ground truth masks corresponding to target individuals within digital training images. Similarly, the training image repository 912 can include classification information with regard to a training digital image or target object.

As illustrated in FIG. 9, the storage manager 910 also includes digital image data 914. Digital image data 914 can include information for any digital image utilized by the digital segmentation system 900. For example, digital image data 914 includes a digital image provided by a user, where the user seeks to select a target individual portrayed in the digital image.

Digital image data 914 can also include information generated by the digital segmentation system 900 regarding digital images. For instance, digital image data 914 includes color channels, position channels, shape input channels, metadata, or other information regarding digital images utilized by the digital segmentation system 900.

In addition, digital image data 914 can also include data regarding objects portrayed in digital images. For instance, digital image data 914 includes information regarding target individuals. Specifically, in one or more embodiments, digital image data 914 includes object boundaries corresponding to target individuals, masks corresponding to target individuals, or other information corresponding to objects reflected in digital images.

Each of the components 902-910 of the digital segmentation system 900 and their corresponding elements (as shown in FIG. 9) may be in communication with one another using any suitable communication technologies. It will be recognized that although components 902-910 and their corresponding elements are shown to be separate in FIG. 9, any of components 902-910 and their corresponding elements may be combined into fewer components, such as into a single facility or module, divided into more components, or configured into different components as may serve a particular embodiment.

The components 902-910 and their corresponding elements can comprise software, hardware, or both. For example, the components 902-910 and their corresponding elements can comprise one or more instructions stored on a computer-readable storage medium and executable by processors of one or more computing devices. When executed by the one or more processors, the computer-executable instructions of the digital segmentation system 900 can cause a client device and/or a server device to perform the methods described herein. Alternatively, the components 902-910 and their corresponding elements can comprise hardware, such as a special purpose processing device to perform a certain function or group of functions. Additionally, the components 902-910 and their corresponding elements can comprise a combination of computer-executable instructions and hardware.

Furthermore, the components 902-910 of the digital segmentation system 900 may, for example, be implemented as one or more stand-alone applications, as one or more modules of an application, as one or more plug-ins, as one or more library functions or functions that may be called by other applications, and/or as a cloud-computing model. Thus, the components 902-910 of the digital segmentation system 900 may be implemented as a stand-alone application, such as a desktop or mobile application. Furthermore, the components 902-910 of the digital segmentation system 900 may be implemented as one or more web-based applications hosted on a remote server. Alternatively or additionally, the components of the digital segmentation system 900 may be implemented in a suit of mobile device applications or "apps." To illustrate, the components of the digital segmentation system 900 may be implemented in a digital image editing application, including but not limited to ADOBE® PHOTOSHOP® or ADOBE® REVEL®. "ADOBE®," "ADOBE® PHOTSHOP®," and "ADOBE® REVEL®" are either registered trademarks or trademarks of Adobe Systems Incorporated in the United States and/or other countries.

Figure 10:
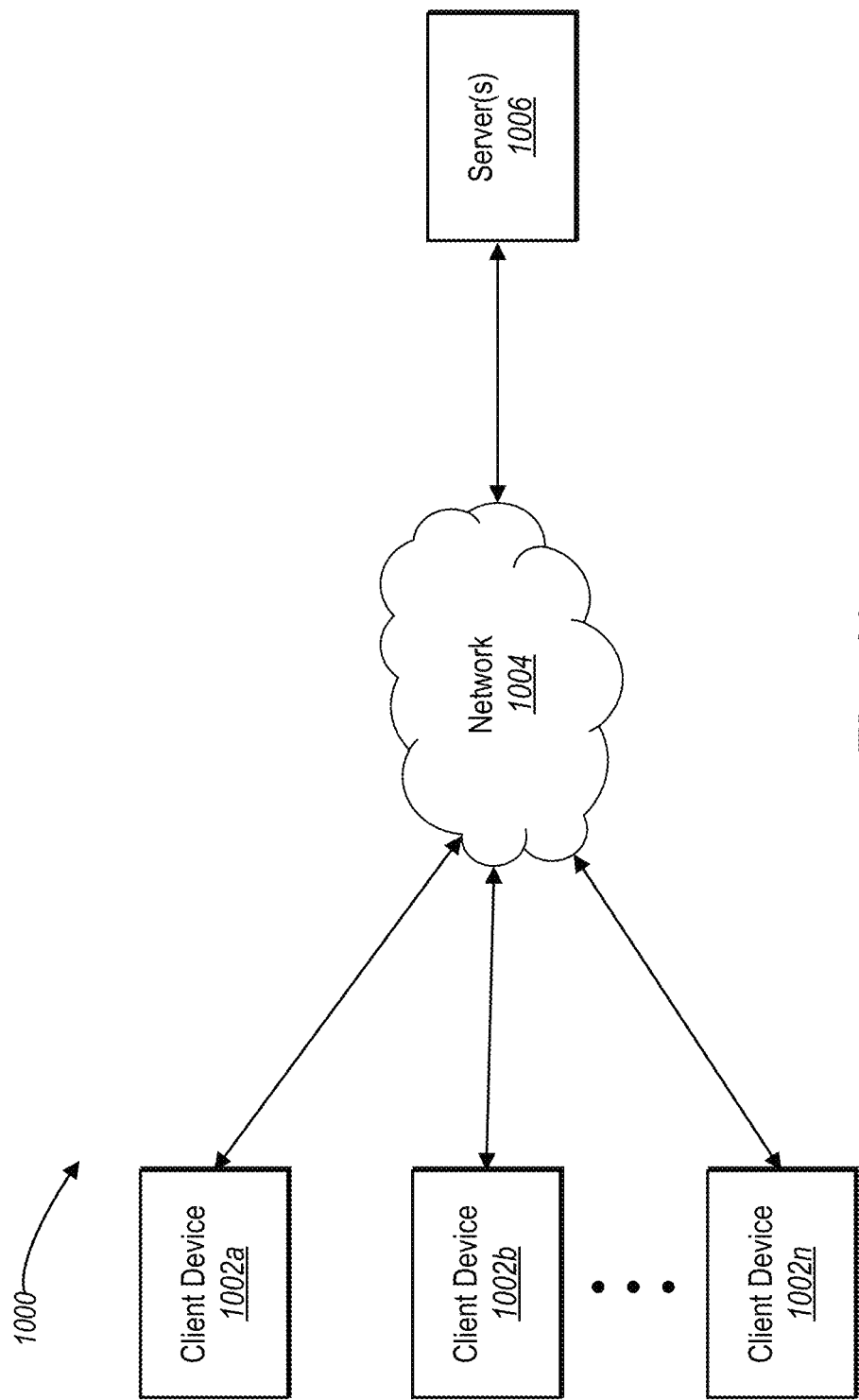
FIG. 10 illustrates a schematic diagram of an exemplary environment in which the digital segmentation system can operate in accordance with one or more embodiments.

For example, FIG. 10 illustrates a schematic diagram of one embodiment of an exemplary environment 1000 in which the digital segmentation system 900 can operate. In one or more embodiments, the environment 1000 includes a server 1006 connected to a plurality of client devices 1002a-1002n via a network 1004. The client devices 1002a-1002n, the network 1004, and the server 1006 may communicate with each other or other components using any communication platforms and technologies suitable for transporting data and/or communication signals, including any known communication technologies, devices, media, and protocols supportive of remote data communications, examples of which will be described in more detail below with respect to FIG. 13.

Although FIG. 10 illustrates a particular arrangement of the client devices 1002a-1002n, the network 1004, and the server 1006, various additional arrangements are possible. For example, the client devices 1002a-1002n may directly communicate with the server 1006, bypassing the network 1004. Or alternatively, the client devices 1002a-1002n may directly communicate with each other.

Similarly, although the environment 1000 of FIG. 10 is depicted as having various components, the environment 1000 may have additional or alternative components. For example, the environment 1000 can be implemented on a single computing device with the digital segmentation system 900. In particular, the digital segmentation system 900 may be implemented in whole or in part on the client device 1002a.

As illustrated in FIG. 10, the environment 1000 may include client devices 1002a-1002n. The client devices 1002a-1002n may comprise any computing device. For example, client devices 1002a-1002n may comprise one or more personal computers, laptop computers, mobile devices, mobile phones, tablets, special purpose computers, TVs, or other computing devices, including computing devices described below with regard to FIG. 13. Although three client devices are presented with regard to FIG. 10, it will be appreciated that client devices 1002a-1002n may comprise any number of client devices (greater or smaller than shown).

Moreover, as illustrated in FIG. 10, the client devices 1002a-1002n and the server 1006 may communicate via the network 1004. The network 1004 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 1004 may be any suitable network over which the client devices 1002a-1002n may access the server 1006, or vice versa. The network 1004 will be discussed in more detail below with regard to FIG. 13.

In addition, the environment 1000 may also include the server 1006. The server 1006 may generate, store, receive, and transmit any type of data, including training image repository 912, digital image data 914, or other information. For example, the server 1006 may receive data from a client device, such as the client device 1002a, and send the data to another client device, such as the client device 1002b and/or 1002n. The server 1006 can also transmit electronic messages between one or more users of the environment 1000. In one example embodiment, the server 1006 is a data server. The server 1006 can also comprise a communication server or a web-hosting server. Additional details regarding the server 1006 will be discussed below with respect to FIG. 13.

As mentioned, in one or more embodiments, the server 1006 can include or implement at least a portion of the digital segmentation system 900. In particular, the digital segmentation system 900 can comprise an application running on the server 1006 or a portion of the digital segmentation system 900 can be downloaded from the server 1006. For example, the digital segmentation system 900 can include a web hosting application that allows the client devices 1002a-1002n to interact with content hosted at the server 1006. To illustrate, in one or more embodiments of the environment 1000, one or more client devices 1002a-1002n can access a webpage supported by the server 1006. In particular, the client device 1002a can run a web application (e.g., a web browser) to allow a user to access, view, and/or interact with a webpage or website hosted at the server 1006.

Upon the client device 1002a accessing a webpage hosted at the server 1006, in one or more embodiments, the server 1006 can provide access to one or more digital images (e.g., the digital image data 914, such as camera roll or an individual's personal photos) stored at the server 1006. Moreover, the client device 1002a can receive a request (i.e., via user input) to select a target individual portrayed within a digital image, and provide the request to the server 1006. Upon receiving the request, the server 1006 can automatically generate a position channel and/or a shape input channel (e.g., via the channel generator 904) with regard to the digital image. Moreover, the server 1006 can provide the position channel and/or the shape input channel as input data for a trained neural network. In addition, the server can apply a trained neural network to the input data and identify a set of pixels reflecting a target individual (e.g., via the neural network application manager 906). The server 1006 can provide the set of pixels (e.g., an object boundary or mask) to the client device 1002a for display to the user. Moreover, the user can provide user input via the client device 1002a indicating modifications to the target object. The server 1006 (e.g., via the digital image manager 908) can modify the target individual (e.g., apply one or more filters to the target individual).

By way of an additional example, in one or more embodiments, the server 1006 generates a trained neural network (e.g., via the neural network training engine 902) and provides the trained neural network to the client device 1002a. In particular, the server 1006 embeds the trained neural network in a digital image editing application installed on the client device (i.e., ADOBE PHOTOSHOP). In one or more embodiments, the client device 1002a receives a request to select a target individual portrayed in a probe digital image (e.g., a probe digital image stored in digital image data 914 on the client device). The client device 1002a utilizes the embedded, trained neural network to select the target individual in the probe digital image (e.g., via the neural network application manager 906). Moreover, upon selecting the target individual, the client device 1002a can modify (e.g., move, copy, paste, or delete) the target object based on additional user input (e.g., utilizing the digital image manager 908).

As just described, the digital segmentation system 900 may be implemented in whole, or in part, by the individual elements 1002a-1006 of the environment 1000. It will be appreciated that although certain components of the digital segmentation system 900 are described in the previous examples with regard to particular elements of the environment 1000, various alternative implementations are possible. For instance, in one or more embodiments, the digital segmentation system 900 is implemented on the client device 1002a. Similarly, in one or more embodiments, the digital segmentation system 900 may be implemented on the server 1006. Moreover, different components and functions of the digital segmentation system 900 may be implemented separately among client devices 1002a-1002n, the server 1006, and the network 1004. For instance, in one or more embodiments the neural network training engine 902 is implemented as part of the server 1006; the neural network application manager 906 is implemented as part of the client devices 1002a-1002n and the server 1006; the digital image manager 908 is implemented as part of the client devices 1002a-1002n and the server 1006; and the storage manager 910 is implemented as part of the client devices 1002a-1002n and the server 1006. The environment 1000 can also be implemented in a variety of additional or alternative arrangements.

Moreover, the digital segmentation system 900 and/or server 1006 can actively collect information independently of a particular client device and independent of other components of the environment 1000. For example, the digital segmentation system 900 and/or server 1006 can actively collect information from interaction between users and the server 1006 (or other servers). Specifically, in one or more embodiments, the digital segmentation system 900 actively collects digital image data 914. For example, the digital segmentation system 900 can actively collect masks (or object boundaries) with regard to target individuals identified in probe digital images. Accordingly, the digital segmentation system 900 can actively collect masks, object boundaries, digital images, or other data utilized by the digital segmentation system 900. Moreover, the digital segmentation system 900 can utilize collected information (e.g., masks, digital images, or other data) to train a neural network (e.g., as part of a repository of electronic documents such as the training image repository 912).

Figure 11:
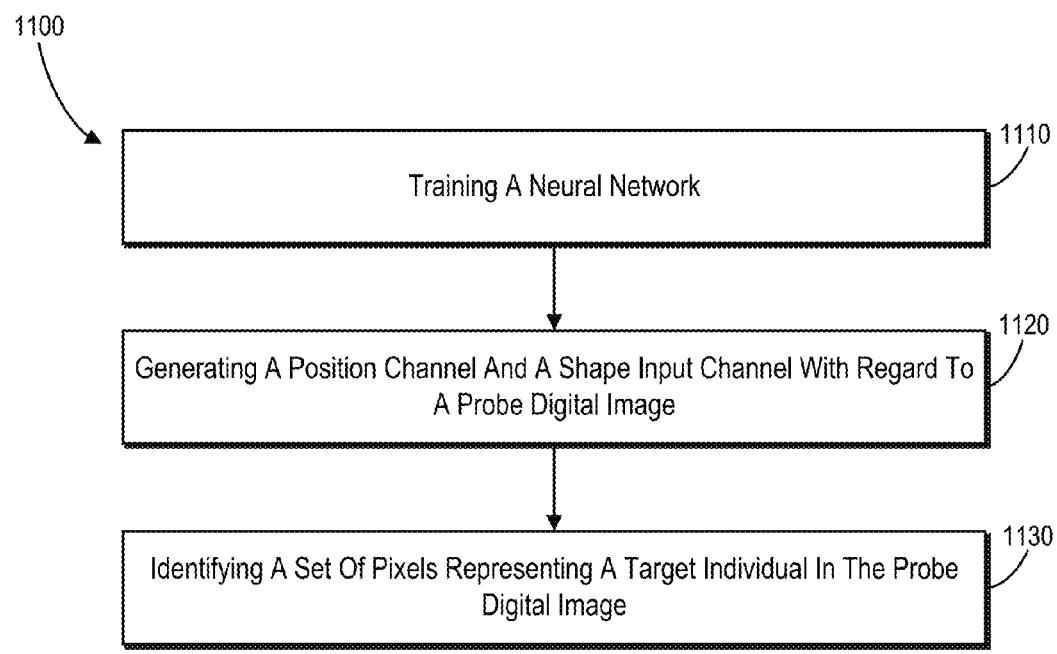
FIG. 11 illustrates a flowchart of a series of acts in a method of selecting an object within digital visual media in accordance with one or more embodiments.
Figure 12:
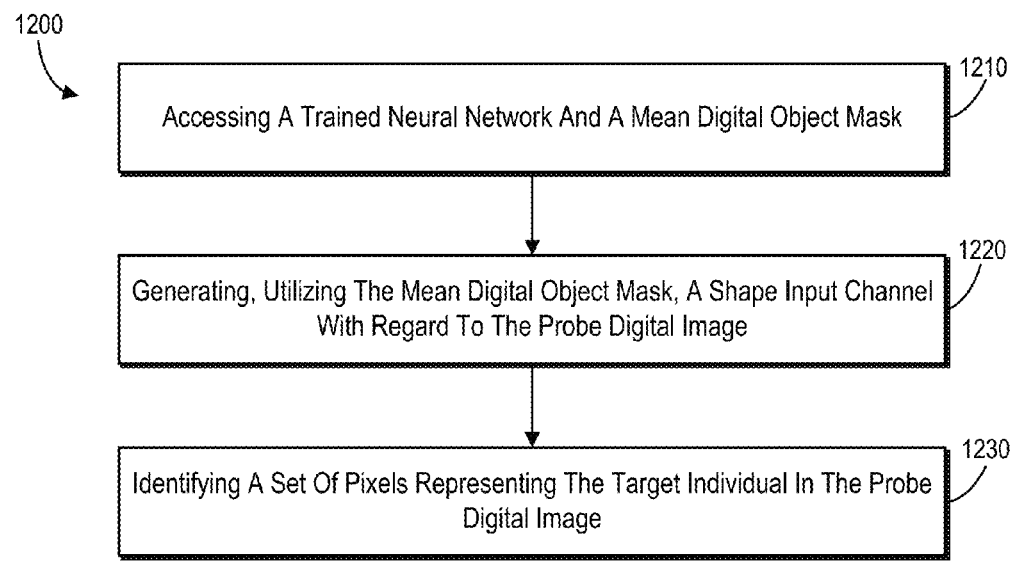
FIG. 12 illustrates another flowchart of a series of acts in a method of selecting an object within digital visual media in accordance with one or more embodiments.

FIGS. 1-10, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIGS. 11-12 illustrates flowcharts of exemplary methods in accordance with one or more embodiments of the present invention. The methods described in relation to FIGS. 11-12 may be performed with less or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart of a series of acts in a method 1100 of selecting target individuals in accordance with one or more embodiments. In one or more embodiments, the method 1100 is performed in a digital medium environment that includes the digital segmentation system 900. The method 1100 is intended to be illustrative of one or more methods in accordance with the present disclosure, and is not intended to limit potential embodiments. Alternative embodiments can include additional, fewer, or different steps than those articulated in FIG. 11.

As illustrated in FIG. 11, the method 1100 includes an act 1110 of training a neural network. In particular, the act 1110 can include training, by at least one processor, a neural network utilizing training input generated from a repository of digital training images. For example, in one or more embodiments, the training input comprises a plurality of training position channels, a plurality of training shape input channels, and a plurality of training color channels corresponding to the digital training images. Each training color channel in the plurality of training color channels reflects colors of pixels in a corresponding digital training image.

In addition, the act 1110 can also include generating the training input. For example, in one or more embodiments, the act 1110 includes generating the training input by identifying a training target individual portrayed in each digital training image. Moreover, the act 1110 can include generating the training input by generating a training position channel for each digital training image. The training position channel for each digital training image indicates positions of pixels in the digital training image relative to the identified training target individual portrayed in the training digital image. Furthermore, the act 1110 can include generating the training input by generating a training shape input channel for each digital training image. The training shape input channel for each digital training image comprises an estimated shape of the identified target individual portrayed in the digital training image.

As shown in FIG. 11, the method 1100 also includes an act 1120 of generating a position channel and a shape input channel with regard to a probe digital image. In particular, the act 1120 can include generating, by the at least one processor, a position channel and a shape input channel with regard to a probe digital image. The probe digital image portrays a target individual, the position channel indicates positions of pixels in the probe digital image relative to the target individual portrayed in the probe digital image, and the shape input channel comprises an estimated shape of the target individual.

Act 1120 can include generating an x-position channel that indicates horizontal positions of pixels in the digital image relative to a face of the target individual portrayed in the probe digital image. Act 1120 also involves generating a y-position channel that indicates vertical positions of pixels in the digital image relative to a face of the target individual portrayed in the probe digital image. Furthermore, the act 1120 can include detecting one or more facial feature points corresponding to a face of the target individual portrayed in the probe digital image. Act 1120 can further involve estimating a transform between a canonical pose that comprises template facial features and the detected one or more facial feature points. Additionally, act 1120 can involve applying the transform to the canonical pose to generate the position channel. For instance, in one or more embodiments, the position channel expresses the position of pixels in the canonical pose in a coordinate system that is centered on the face and scaled according to the size of the face.

In addition, in one or more embodiments, the act 1120 includes generating a mean digital object mask from a plurality of digital images that each portray a target individual. Generating the mean digital object mask comprises generating a shape corresponding to the target individuals portrayed in the plurality of digital images. Act 1120 further involves utilizing the mean digital object mask to generate the shape input channel. For example, the act 1120 can include identifying a set of pixels representing a target individual in a digital image from the plurality of digital images. Act 1120 can also include identifying one or more facial feature points corresponding to the target individual in the digital image. Act 1120 can also involve estimating a first transform between the facial feature points and a canonical pose. Additionally, act 1120 involves applying the first transform to the set of pixels representing the target individual in the digital image. Furthermore, the act 1120 can include detecting one or more facial feature points corresponding to the target individual portrayed in the probe digital image. Then act 1120 can involve estimating a second transform based on the detected one or more facial feature points corresponding to the target individual portrayed in the probe digital image and the canonical pose. At this point, act 1120 can include applying the second transform to the mean digital object mask to generate the shape input channel.

In addition, as illustrated in FIG. 11, the method 1100 also includes an act 1130 of identifying a set of pixels representing a target individual in the probe digital image. In particular, the act 1130 can include utilizing the trained neural network, the generated position channel, and the generated shape input channel to identify a set of pixels representing the target individual in the probe digital image. For example, in one or more embodiments, the act 1130 includes upon receiving a request to select the target individual in the probe digital image, automatically identifying the set of pixels representing the target individual in the probe digital image without additional user input.

Moreover, in one or more embodiments, the method 1100 further comprises generating a color channel for the probe digital image that reflects colors of pixels in the digital training image. Furthermore, in one or more embodiments, the method 1100 identifies the set of pixels representing the target individual by utilizing the generated color channel.

In addition, in one or more embodiments, the method 1100 also include modifying the probe digital image based on the set of pixels representing the target individual in the probe digital image. For example, the method 1100 can include modifying the probe digital image based on the set of pixels representing the target individual in the probe digital image by applying a first image filter to the set of pixels representing the target individual in the probe digital image; and applying a second image filter to other pixels in the probe digital image.

As mentioned, FIG. 12 also illustrates a flowchart of a series of acts in a method 1200 of selecting target individuals in accordance with one or more embodiments. As shown in FIG. 12, the method 1200 includes an act 1210 of accessing a trained neural network and a mean digital object mask. In particular, the act 1210 can include accessing a trained neural network generated from a repository of digital training images and a mean digital object mask reflecting a shape based on each of the training target individuals portrayed in the digital training images. Each of the digital training images portrays a training target individual.

In addition, as shown in FIG. 12, the method 1200 also includes an act 1220 of generating, utilizing the mean digital object mask, a shape input channel with regard to the probe digital image. In particular, the act 1220 can include generating, by the at least one processor and utilizing the mean digital object mask, a shape input channel, with regard to the probe digital image, that comprises an estimated shape of the target individual based on the mean digital object mask. For example, the act 1220 can include detecting one or more facial feature points corresponding to the target individual portrayed in the probe digital image; estimating a transform based on the detected one or more facial feature points corresponding to the target individual portrayed in the probe digital image and a canonical pose; and applying the transform to the mean digital object mask to generate the shape input channel.

Furthermore, as illustrated in FIG. 12, the method 1200 also includes an act 1230 of identifying a set of pixels representing the target individual in the probe digital image. In particular, the method 1230 can include utilizing the trained neural network and the generated shape input channel to identify a set of pixels representing the target individual in the probe digital image.

The method 1200 can also include generating a position channel that indicates the position of each pixel in the probe digital image relative to a face of the target individual portrayed in the probe digital image. For example, in one or more embodiments, the method 1200 comprises generating an x-position channel that indicates horizontal positions of pixels in the digital image relative to a face of the target individual portrayed in the probe digital image. The method 1200 further comprises generating a y-position channel that indicates vertical positions of pixels in the digital image relative to a face of the target individual portrayed in the probe digital image. In addition, the method 1200 can include detecting one or more facial feature points corresponding to the target individual portrayed in the probe digital image. The method then can involve estimating a transform between the detected one or more facial feature points and a canonical pose that comprises template facial features. Then method 1200 can involve applying the transform to the canonical pose to generate the position channel.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
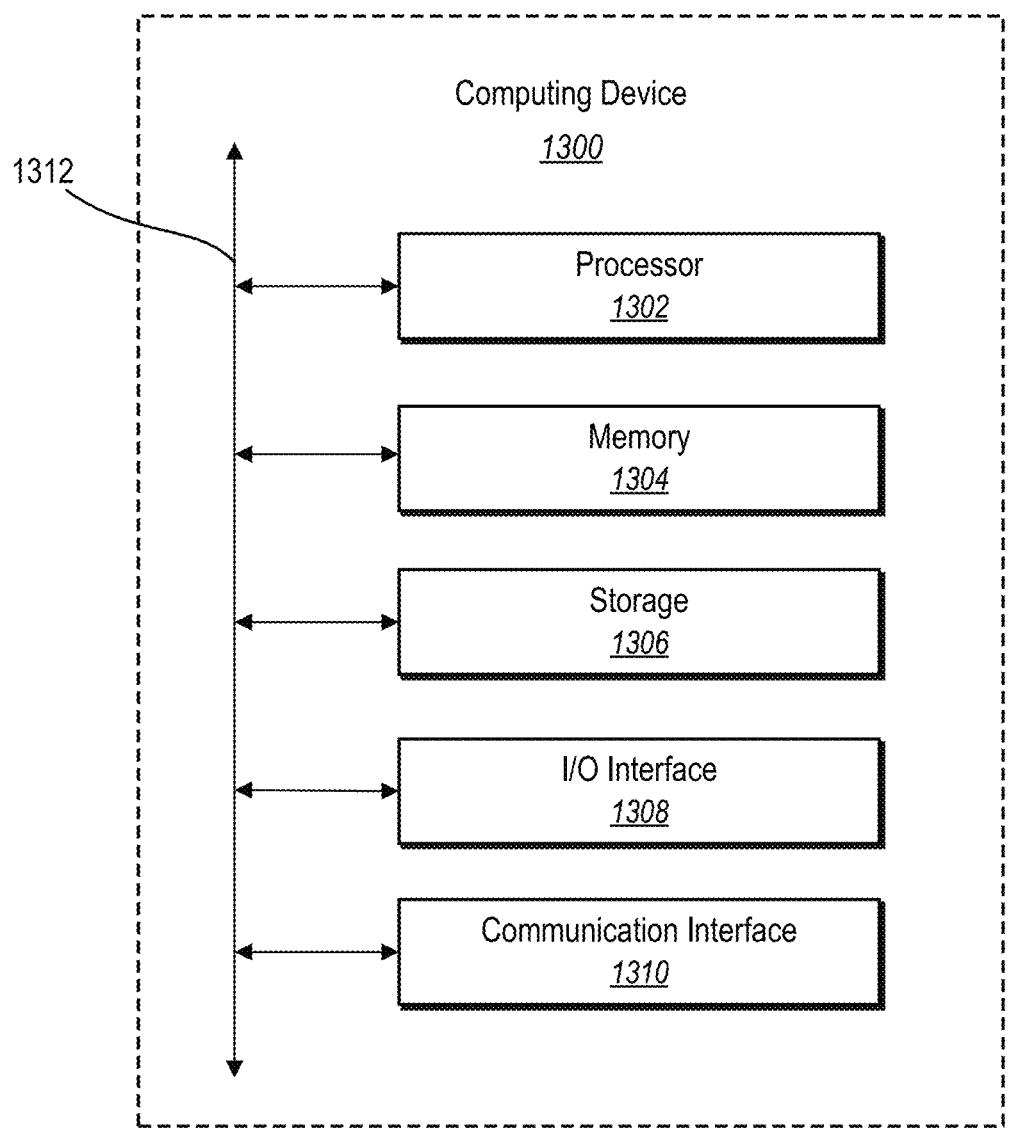
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that the digital segmentation system 100 can comprise implementations of the computing device 1300. As shown by FIG. 13, the computing device can comprise a processor 1302, memory 1304, a storage device 1306, an I/O interface 1308, and a communication interface 1310. While an exemplary computing device 1300 is shown in FIG. 13, the components illustrated in FIG. 13 are not intended to be limiting. Additional or alternative components may be used in other embodiments. Furthermore, in certain embodiments, a computing device 1300 can include fewer components than those shown in FIG. 13. Components of computing device 1300 shown in FIG. 13 will now be described in additional detail.

In particular embodiments, processor(s) 1302 includes hardware for executing instructions, such as those making up a computer program. As an example and not by way of limitation, to execute instructions, processor(s) 1302 may retrieve (or fetch) the instructions from an internal register, an internal cache, memory 1304, or a storage device 1306 and decode and execute them. In particular embodiments, processor(s) 1302 may include one or more internal caches for data, instructions, or addresses. As an example and not by way of limitation, processor(s) 1302 may include one or more instruction caches, one or more data caches, and one or more translation lookaside buffers (TLBs). Instructions in the instruction caches may be copies of instructions in memory 1304 or storage 1306.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example and not by way of limitation, storage device 1306 can comprise a non-transitory storage medium described above. The storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to the computing device 1300. In particular embodiments, storage device 1306 is non-volatile, solid-state memory. In particular embodiments, storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a stylus or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1310. As an example and not by way of limitation, computing device 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1300 may include any suitable communication interface 1310 for any of these networks, where appropriate.

The computing device 1300 can further include a bus 1312. The bus 1312 can comprise hardware, software, or both that couples components of computing device 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for editing digital visual media, a method of using deep learning to automatically select individuals portrayed in the digital visual media, the method comprising:
   training, by at least one processor, a neural network utilizing training input generated from a repository of digital training images;
   generating, by the at least one processor, with regard to a probe digital image portraying a target individual, a position channel that indicates positions of pixels in the probe digital image relative to the target individual portrayed in the probe digital image by determining a transform between one or more feature points of the target individual and a canonical pose; and
   identifying, by the at least one processor, a set of pixels representing the target individual in the probe digital image utilizing the trained neural network and the position channel.

2. The method of claim 1, wherein:
   the training input comprises a plurality of training position channels, a plurality of training shape input channels, and a plurality of training color channels corresponding to the digital training images, wherein each training color channel in the plurality of training color channels reflect colors of pixels in a corresponding digital training image;
   the method further comprises generating a color channel that reflects colors of pixels in the digital training image; and
   the method identifies the set of pixels representing the target individual by utilizing the color channel.

3. The method of claim 2, further comprising generating the training input by:
   identifying a training target individual portrayed in each digital training image;
   generating a training position channel for each digital training image that indicates positions of pixels in the digital training image relative to the identified training target individual portrayed in the training digital image; and
   generating a training shape input channel for each digital training image that comprises an estimated shape of the identified target individual portrayed in the digital training image.

4. The method of claim 1, wherein generating the position channel further comprises:
   generating an x-position channel that indicates horizontal positions of pixels in the probe digital image relative to a face of the target individual portrayed in the probe digital image; and
   generating a y-position channel that indicates vertical positions of pixels in the probe digital image relative to the face of the target individual portrayed in the probe digital image.

5. The method of claim 1, wherein generating the position channel further comprises:
   detecting one or more facial feature points corresponding to a face of the target individual portrayed in the probe digital image;
   estimating the transform between the detected one or more facial feature points and the canonical pose, wherein the canonical pose comprises template facial features; and
   applying the transform to the canonical pose to generate the position channel.

6. The method of claim 5, wherein the position channel expresses the position of pixels in the canonical pose in a coordinate system that is centered on the face and scaled according to a size of the face.

7. The method of claim 1, further comprising:
   generating a shape input channel that comprises an estimated shape of the target individual by:
      generating a mean digital object mask based on target individuals in a plurality of digital images, the mean digital object mask comprising a shape corresponding to the target individuals in the plurality of digital images; and
      utilizing the mean digital object mask to generate the shape input channel; and
   identifying the set of pixels representing the target individual in the probe digital image utilizing the trained neural network, the position channel, and the shape input channel.

8. The method of claim 7, wherein generating the mean digital object mask comprises:
   identifying a set of pixels representing a target individual in a digital image from the plurality of digital images;
   identifying one or more facial feature points corresponding to the target individual in the digital image;
   estimating a first transform between the facial feature points and a canonical pose; and
   applying the first transform to the set of pixels representing the target individual in the digital image.

9. The method of claim 8, wherein utilizing the mean digital object mask to generate the shape input channel comprises:
   detecting one or more facial feature points corresponding to the target individual portrayed in the probe digital image;
   estimating a second transform based on the detected one or more facial feature points corresponding to the target individual portrayed in the probe digital image and the canonical pose; and
   applying the second transform to the mean digital object mask to generate the shape input channel.

10. The method of claim 1, further comprising modifying the probe digital image based on the set of pixels representing the target individual in the probe digital image by applying one or more of:
    a first image filter to the set of pixels representing the target individual in the probe digital image; or
    a second image filter to other pixels in the probe digital image.

11. The method of claim 1, wherein identifying, by the at least one processor, the set of pixels representing the target individual in the probe digital image further comprises: upon receiving a request to select the target individual in the probe digital image, automatically identifying the set of pixels representing the target individual in the probe digital image without additional user input.

12. In a digital medium environment for editing digital visual media, a method of using deep learning to automatically select individuals portrayed in the digital visual media, the method comprising:
    accessing:
        a trained neural network generated from a repository of digital training images, wherein each of the digital training images portrays a training target individual, and
        a mean digital object mask reflecting a shape based on each of the training target individuals portrayed in the digital training images;
    generating, with regard to a probe digital image by at least one processor and utilizing the mean digital object mask, a shape input channel comprising an estimated shape of a target individual based on the mean digital object mask by estimating a transform between one or more facial feature points corresponding to the target individual portrayed in the probe digital image and a canonical pose; and
    identifying, by the at least one processor, a set of pixels representing the target individual in the probe digital image utilizing the trained neural network and the generated shape input channel.

13. The method of claim 12, wherein utilizing the mean digital object mask to generate the shape input channel comprises:
    detecting the one or more facial feature points corresponding to the target individual portrayed in the probe digital image;
    estimating the transform based on the detected one or more facial feature points corresponding to the target individual portrayed in the probe digital image and the canonical pose, wherein the canonical pose comprises template facial features; and
    applying the transform to the mean digital object mask to generate the shape input channel.

14. The method of claim 12, further comprising generating a position channel, wherein the position channel indicates a position of pixels in the probe digital image relative to a face of the target individual portrayed in the probe digital image.

15. The method of claim 14, wherein generating the position channel further comprises:
    generating an x-position channel that indicates horizontal positions of pixels in the probe digital image relative to a face of the target individual portrayed in the probe digital image; and
    generating a y-position channel that indicates vertical positions of pixels in the probe digital image relative to the face of the target individual portrayed in the probe digital image.

16. The method of claim 14, wherein generating the position channel further comprises:
    detecting facial feature points corresponding to the target individual portrayed in the probe digital image;
    estimating a second transform between the detected facial feature points and a canonical pose, wherein the canonical pose comprises template facial features; and
    applying the second transform to the canonical pose to generate the position channel.

17. A system for identifying target objects within digital visual media, comprising:
    at least one processor; and
    at least one non-transitory computer readable storage medium storing instructions thereon, that, when executed by the at least one processor, cause the system to:
        generate a plurality of training color channels and a plurality of training shape input channels with regard to a plurality of digital training digital images, wherein each digital training image portrays a target individual;
        train a neural network utilizing the plurality of training color channels and the plurality of training shape input channels;
        generate a color channel and a shape input channel with regard to a probe digital image, wherein the probe digital image portrays a target individual, the color channel reflects colors of pixels in the digital training image and the shape input channel comprises an estimated shape of the target individual based on a transform between one or more features of the target individual and a canonical pose; and
        identify a set of pixels representing the target individual in the probe digital image utilizing the trained neural network, the generated color channel, and the generated shape input channel.

18. The system of claim 17, further comprising instructions that, when executed by the at least one processor, cause the system to:
    generate a plurality of training position channels;
    train the neural network utilizing the plurality of training position channels;
    generate a position channel with regard to the probe digital image, wherein the position channel indicates positions of pixels in the probe digital image relative to the target individual portrayed in the probe digital image, and
    identify the set of pixels representing the target individual in the probe digital image utilizing the generated position channel.

19. The system of claim 18, wherein the instructions, when executed by the at least one processor, cause the system to generate the plurality of training position channels and the plurality of training shape input channels by performing steps comprising:
    generating a training position channel for each digital training image in the plurality of digital training images, wherein the training position channel for each digital training image indicates positions of pixels in the digital training image relative to the training target individual portrayed in the training digital image; and
    generating a training shape input channel for each digital training image in the plurality of digital training images, wherein the training shape input channel for each digital training image comprises an estimated shape of the identified target individual portrayed in the training digital image.

20. The system of claim 17, wherein the instructions, when executed by the at least one processor, cause the system to generate the shape input channel by performing steps comprising:
    generating a mean digital object mask from a plurality of digital images, wherein each of the plurality of digital images portray a target individual, and the mean digital object mask comprises a shape corresponding to the target individuals portrayed in the plurality of digital images; and utilizing the mean digital object mask to generate the shape input channel.

* * * * *